United States Patent
Petersen et al.

(10) Patent No.: US 9,191,229 B2
(45) Date of Patent: Nov. 17, 2015

(54) REMOTE PARTICIPATION IN A LOCAL AREA NETWORK (LAN) BASED MEDIA AGGREGATION NETWORK

(75) Inventors: Steven L. Petersen, Los Gatos, CA (US); Harold Sutherland, San Jose, CA (US)

(73) Assignee: ELOY TECHNOLOGY, LLC, Wilmington, DE (US)

(*) Notice: Subject to any disclaimer, the term of this patent is extended or adjusted under 35 U.S.C. 154(b) by 1064 days.

(21) Appl. No.: 12/696,091

(22) Filed: Jan. 29, 2010

(65) Prior Publication Data

US 2012/0113964 A1    May 10, 2012

Related U.S. Application Data

(60) Provisional application No. 61/149,202, filed on Feb. 2, 2009.

(51) Int. Cl.
*H04W 4/00* (2009.01)
*H04L 12/28* (2006.01)

(52) U.S. Cl.
CPC .................................. *H04L 12/2809* (2013.01)

(58) Field of Classification Search
CPC ............. H04L 29/12537; H04L 61/2575; H04L 29/125; H04L 61/2564; H04L 29/12528; H04L 61/2578
USPC ............... 370/327–328, 338, 389, 395.54; 455/422.1–460, 524–525
See application file for complete search history.

(56) References Cited

U.S. PATENT DOCUMENTS

| | | | |
|---|---|---|---|
| 5,544,313 A | 8/1996 | Shachnai et al. |
| 6,321,224 B1 | 11/2001 | Beall et al. |
| 6,466,980 B1 | 10/2002 | Lumelsky et al. |
| 6,484,165 B1 | 11/2002 | Beall et al. |
| 6,633,903 B1 | 10/2003 | Gould |
| 6,714,215 B1 | 3/2004 | Flora et al. |

(Continued)

FOREIGN PATENT DOCUMENTS

| | | |
|---|---|---|
| CN | 1395794 A | 2/2003 |
| CN | 1726555 A | 1/2006 |

(Continued)

OTHER PUBLICATIONS

"How to Share Files in Windows XP," at <http://compnetworking.about.com/od/windo . . . >, from Internet Archive dated Mar. 31, 2006, printed Feb. 26, 2012, 2 pages.

(Continued)

*Primary Examiner* — Jung-Jen Liu

(57) ABSTRACT

Systems and methods relating to a Media Collection Aggregation System (MCAS) are provided. In one embodiment, a number of nodes are connected over a Local Area Network (LAN) to provide an ad-hoc MCAS network. At least some of the nodes in the MCAS network share locally stored media collections, or select subsets thereof, with the other nodes in the MCAS network. Each node in the MCAS network selects and aggregates one or more of the shared media collections to provide an aggregate media collection for that node. One of the nodes in the MCAS network is a proxy node that provides a proxy service that enables remote participation in the MCAS network. In one embodiment, the proxy node enables one or more remote nodes to passively and/or actively participate in the MCAS network.

33 Claims, 16 Drawing Sheets

(56) References Cited

U.S. PATENT DOCUMENTS

| | | |
|---|---|---|
| 6,728,760 B1 | 4/2004 | Fairchild et al. |
| 6,748,376 B1 | 6/2004 | Beall et al. |
| 6,886,035 B2 | 4/2005 | Wolff |
| 6,907,458 B2 | 6/2005 | Tomassetti et al. |
| 6,920,281 B1 | 7/2005 | Agnibotri et al. |
| 6,953,886 B1 | 10/2005 | Looney et al. |
| 6,954,790 B2 | 10/2005 | Forslow |
| 6,987,221 B2 | 1/2006 | Platt |
| 6,993,532 B1 | 1/2006 | Platt et al. |
| 7,024,424 B1 | 4/2006 | Platt et al. |
| 7,103,645 B2 | 9/2006 | Leighton et al. |
| 7,113,999 B2 | 9/2006 | Pestoni et al. |
| 7,117,266 B2 | 10/2006 | Fishman et al. |
| 7,197,490 B1 | 3/2007 | English |
| 7,197,557 B1 | 3/2007 | Asar et al. |
| 7,296,031 B1 | 11/2007 | Platt et al. |
| 7,313,571 B1 | 12/2007 | Platt et al. |
| 7,333,092 B2 | 2/2008 | Zadesky et al. |
| 7,363,361 B2 | 4/2008 | Tewari et al. |
| 7,373,144 B1 | 5/2008 | Kirkpatrick et al. |
| 7,373,644 B2 | 5/2008 | Aborn |
| 7,426,537 B2 | 9/2008 | Lee et al. |
| 7,483,958 B1 | 1/2009 | Elabbady et al. |
| 7,548,934 B1 | 6/2009 | Platt et al. |
| 7,636,509 B2 | 12/2009 | Davis |
| 7,668,939 B2 | 2/2010 | Encarnacion et al. |
| 7,680,814 B2 | 3/2010 | Mercer et al. |
| 7,680,959 B2 | 3/2010 | Svendsen |
| 7,685,210 B2 | 3/2010 | Plastina et al. |
| 7,689,510 B2 | 3/2010 | Lamkin et al. |
| 7,696,427 B2 | 4/2010 | West et al. |
| 7,702,728 B2 | 4/2010 | Zaner et al. |
| 7,730,216 B1 | 6/2010 | Issa et al. |
| 7,747,620 B2 | 6/2010 | Beaupre |
| 7,752,265 B2 | 7/2010 | Svendsen et al. |
| 7,779,097 B2 | 8/2010 | Lamkin et al. |
| 7,792,756 B2 | 9/2010 | Plastina et al. |
| 7,840,620 B2 | 11/2010 | Vignoli et al. |
| 7,853,712 B2 | 12/2010 | Amidon et al. |
| 7,917,557 B2 | 3/2011 | Shteyn et al. |
| 8,059,646 B2 | 11/2011 | Svendsen et al. |
| 8,224,899 B2 | 7/2012 | Svendsen et al. |
| 8,285,810 B2 | 10/2012 | Svendsen et al. |
| 8,285,811 B2 | 10/2012 | Svendsen et al. |
| 2002/0029384 A1 | 3/2002 | Griggs |
| 2002/0069278 A1 | 6/2002 | Forslow |
| 2003/0032419 A1 | 2/2003 | Shibasaki et al. |
| 2003/0037157 A1 | 2/2003 | Pestoni et al. |
| 2003/0093790 A1 | 5/2003 | Logan et al. |
| 2003/0110510 A1 | 6/2003 | Gong et al. |
| 2003/0167295 A1 | 9/2003 | Choo |
| 2003/0212804 A1 | 11/2003 | Hashemi |
| 2003/0227478 A1 | 12/2003 | Chatfield |
| 2005/0149480 A1 | 7/2005 | Deshpande |
| 2005/0149508 A1 | 7/2005 | Deshpande |
| 2005/0154608 A1 | 7/2005 | Paulson et al. |
| 2005/0212767 A1 | 9/2005 | Marvit et al. |
| 2005/0240494 A1 | 10/2005 | Cue et al. |
| 2005/0251565 A1 | 11/2005 | Weel |
| 2005/0251576 A1 | 11/2005 | Weel |
| 2005/0262246 A1 | 11/2005 | Menon et al. |
| 2006/0008256 A1 | 1/2006 | Khedouri et al. |
| 2006/0044466 A1 | 3/2006 | Kelly et al. |
| 2006/0069998 A1 | 3/2006 | Artman et al. |
| 2006/0107056 A1 * | 5/2006 | Bhatt et al. .................. 713/176 |
| 2006/0143236 A1 | 6/2006 | Wu |
| 2006/0167956 A1 | 7/2006 | Chasen et al. |
| 2006/0179078 A1 | 8/2006 | McLean |
| 2006/0195515 A1 | 8/2006 | Beaupre et al. |
| 2006/0195902 A1 | 8/2006 | King et al. |
| 2006/0212478 A1 | 9/2006 | Plastina et al. |
| 2006/0218613 A1 | 9/2006 | Bushnell |
| 2006/0242106 A1 | 10/2006 | Bank |
| 2006/0245367 A1 | 11/2006 | Jeffery et al. |
| 2006/0265349 A1 | 11/2006 | Hicken |
| 2006/0265467 A1 | 11/2006 | Jang |
| 2007/0025194 A1 | 2/2007 | Morse et al. |
| 2007/0031109 A1 | 2/2007 | Tsuboi et al. |
| 2007/0033225 A1 | 2/2007 | Davis |
| 2007/0038647 A1 | 2/2007 | Thomas et al. |
| 2007/0048713 A1 | 3/2007 | Plastina et al. |
| 2007/0048714 A1 | 3/2007 | Plastina et al. |
| 2007/0061416 A1 | 3/2007 | Gould |
| 2007/0083556 A1 | 4/2007 | Plastina et al. |
| 2007/0168544 A1 | 7/2007 | Sciammarella |
| 2007/0168554 A1 | 7/2007 | Dinger et al. |
| 2007/0220081 A1 | 9/2007 | Hyman |
| 2007/0239778 A1 | 10/2007 | Gallagher |
| 2007/0244856 A1 | 10/2007 | Plastina et al. |
| 2007/0244880 A1 | 10/2007 | Martin et al. |
| 2007/0266001 A1 | 11/2007 | Williams et al. |
| 2007/0276826 A1 | 11/2007 | Chand et al. |
| 2007/0282949 A1 | 12/2007 | Fischer et al. |
| 2007/0299681 A1 | 12/2007 | Plastina et al. |
| 2008/0005179 A1 | 1/2008 | Friedman et al. |
| 2008/0016205 A1 | 1/2008 | Svendsen |
| 2008/0052349 A1 * | 2/2008 | Lin .................. 709/203 |
| 2008/0052371 A1 | 2/2008 | Partovi et al. |
| 2008/0080392 A1 | 4/2008 | Walsh et al. |
| 2008/0091717 A1 | 4/2008 | Garbow et al. |
| 2008/0091771 A1 | 4/2008 | Allen et al. |
| 2008/0091812 A1 * | 4/2008 | Lev-Ran et al. ............. 709/223 |
| 2008/0104122 A1 | 5/2008 | Hempleman et al. |
| 2008/0132175 A1 | 6/2008 | Loeb et al. |
| 2008/0133441 A1 | 6/2008 | West et al. |
| 2008/0133759 A1 | 6/2008 | Weel |
| 2008/0147711 A1 | 6/2008 | Spiegelman et al. |
| 2008/0147798 A1 | 6/2008 | Paalasmaa et al. |
| 2008/0154798 A1 | 6/2008 | Valz |
| 2008/0154967 A1 | 6/2008 | Heikes et al. |
| 2008/0155057 A1 | 6/2008 | Khedouri et al. |
| 2008/0176511 A1 | 7/2008 | Tan et al. |
| 2008/0189436 A1 * | 8/2008 | Vaswani et al. ............... 709/242 |
| 2008/0189617 A1 | 8/2008 | Covell et al. |
| 2008/0205205 A1 | 8/2008 | Chiang et al. |
| 2008/0208823 A1 | 8/2008 | Hicken |
| 2008/0209577 A1 | 8/2008 | Vrielink et al. |
| 2008/0222188 A1 | 9/2008 | Watson et al. |
| 2008/0256032 A1 | 10/2008 | Vignoli et al. |
| 2009/0019156 A1 | 1/2009 | Mo et al. |
| 2009/0037005 A1 | 2/2009 | Larsen et al. |
| 2009/0037382 A1 * | 2/2009 | Ansari et al. ..................... 707/3 |
| 2009/0060467 A1 | 3/2009 | Grigsby et al. |
| 2009/0063975 A1 | 3/2009 | Bull et al. |
| 2009/0070438 A1 | 3/2009 | Bartholomew |
| 2009/0080635 A1 | 3/2009 | Altberg et al. |
| 2009/0083117 A1 | 3/2009 | Svendsen et al. |
| 2009/0094317 A1 | 4/2009 | Venkitaraman |
| 2009/0138505 A1 | 5/2009 | Purdy |
| 2009/0164199 A1 | 6/2009 | Amidon et al. |
| 2009/0164452 A1 | 6/2009 | Yogaratnam et al. |
| 2009/0164600 A1 | 6/2009 | Issa et al. |
| 2009/0165356 A1 | 7/2009 | Blum |
| 2009/0177654 A1 | 7/2009 | Beaupre et al. |
| 2009/0193338 A1 | 7/2009 | Fiatal |
| 2009/0216859 A1 | 8/2009 | Dolling |
| 2009/0217352 A1 | 8/2009 | Shen et al. |
| 2009/0222392 A1 | 9/2009 | Martin et al. |
| 2009/0249222 A1 | 10/2009 | Schmidt et al. |
| 2009/0254643 A1 | 10/2009 | Terheggen et al. |
| 2009/0265218 A1 | 10/2009 | Amini et al. |
| 2009/0265356 A1 | 10/2009 | Hyman et al. |
| 2009/0265416 A1 | 10/2009 | Svendsen et al. |
| 2009/0265417 A1 | 10/2009 | Svendsen et al. |
| 2009/0265418 A1 | 10/2009 | Svendsen et al. |
| 2009/0265426 A1 * | 10/2009 | Svendsen et al. ............. 709/204 |
| 2009/0326970 A1 | 12/2009 | Estrada et al. |
| 2010/0023578 A1 | 1/2010 | Brant et al. |
| 2010/0037752 A1 | 2/2010 | Hansson et al. |
| 2010/0070490 A1 | 3/2010 | Amidon et al. |
| 2010/0070537 A1 | 3/2010 | Amidon et al. |
| 2010/0071070 A1 | 3/2010 | Jawa et al. |
| 2010/0082135 A1 | 4/2010 | Amidon et al. |
| 2010/0094833 A1 | 4/2010 | Svendsen |

(56) References Cited

U.S. PATENT DOCUMENTS

| | | | |
|---|---|---|---|
| 2010/0094834 A1 | 4/2010 | Svendsen | |
| 2010/0094934 A1 | 4/2010 | Svenden et al. | |
| 2010/0094935 A1 | 4/2010 | Svendsen et al. | |
| 2010/0107117 A1 | 4/2010 | Pearce et al. | |
| 2010/0114979 A1 | 5/2010 | Petersen | |
| 2010/0115553 A1 | 5/2010 | Van Flandern et al. | |
| 2010/0134647 A1 | 6/2010 | Orboubadian | |
| 2010/0197318 A1 | 8/2010 | Petersen et al. | |
| 2010/0197319 A1 | 8/2010 | Petersen et al. | |
| 2010/0198818 A1 | 8/2010 | McLaughlin | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1 | 8/2010 | Petersen et al. | |
| 2011/0004840 A1 | 1/2011 | Feinberg et al. | |
| 2011/0060994 A1 | 3/2011 | Maxwell et al. | |
| 2011/0066646 A1 | 3/2011 | Danado et al. | |
| 2011/0145327 A1 | 6/2011 | Stewart | |
| 2011/0208831 A1 | 8/2011 | Ho et al. | |
| 2011/0304685 A1* | 12/2011 | Khedouri et al. | 348/14.02 |
| 2011/0317705 A1* | 12/2011 | Takeda | 370/392 |
| 2012/0023430 A1 | 1/2012 | Amidon et al. | |
| 2012/0259737 A1 | 10/2012 | Pousti et al. | |
| 2012/0311114 A1* | 12/2012 | Cheshire | 709/221 |
| 2012/0331166 A2* | 12/2012 | Stirbu et al. | 709/230 |
| 2013/0014238 A1* | 1/2013 | See et al. | 726/6 |

FOREIGN PATENT DOCUMENTS

| | | |
|---|---|---|
| CN | 1909633 A | 2/2007 |
| CN | 101021852 A | 8/2007 |
| CN | 101115019 A | 1/2008 |
| CN | 101233522 A | 7/2008 |
| WO | 2007/069004 A1 | 6/2007 |
| WO | 2007092053 A1 | 8/2007 |
| WO | 2007137626 A1 | 12/2007 |

OTHER PUBLICATIONS

"Microsoft Windows XP tutorial free. Unit 4 Windows Explorer," at <http://www.teacherclick.com/winxp/t_4_1.htm>, copyright Nov. 2005, aulaClic, printed Feb. 26, 2012, 4 pages.

"Libox—About us," at <http://www.libox.com/about/>, from the Internet Archive, dated Oct. 26, 2009, copyright 2009, Libox, printed Apr. 19, 2012, 1 page.

"Our Company | mSpot," at <http://www.mspotcorporate.com/>, from the Internet Archive, dated May 14, 2010, copyright 2010, mSpot, Incorporated, printed Apr. 19, 2012, 3 pages.

Yufeng Dou et al., "An Approach to Analyzing Correlation between Songs/Artists Using iTMS Playlists," Proceedings of the International Conference on Computational Intelligence for Modelling, Control and Automation and International Conference on Intelligent Agents, Web Technologies and Internet Commerce vol. 1 (CIMCA-IAWTIC'06), vol. 1, pp. 951-956, 2005, 1 page.

"Firefly Media Server :: Home Page," http://www.fireflymediaserver.org/, printed Feb. 3, 2009, 1 page.

"Apple—iTunes—What is iTunes?—A player, a store, and more," http://www.apple.com/itunes/whatis/, printed Aug. 11, 2009, 2 pages.

"DNS Service Discovery (DNS-SD)," http://www.dns-sd.org/, printed May 18, 2010, 4 pages.

Tallberg, Mathias, "P2P-Based Roaming Between Home WLAN Hotspots," http://whitepaper.techworld.com/wireless-networking-wlan-wi-fi/4587/p2p-based-roaming-between-home-wlan-hotspots/, Mar. 1, 2007, 6 pages.

Wu et al., "Next Generation Mobile Multimedia Communications: Media Codec and Media Transport Perspectives," China Communications, Oct. 2006, 15 pages.

Zahariadis et al., "Scalable Content Delivery Over P2P Convergent Networks," 12th IEEE International Symposium on Consumer Electronics, (ISCE 2008), Vilamoura, Portugal, (Apr. 14-16, 2008), 4 pages.

"Celtius XDM Server," copyright 2007, Celtius Ltd., originally found at <http://www.celtius.com/s.asp?p=494>, found at Internet Archive, dated Oct. 9, 2007, printed Apr. 28, 2011, 2 pages.

"FLUTE—File Delivery over Unidirectional Transport," Oct. 2004, copyright 2004, The Internet Society, at <http://tools.ietf.org/html/rfc3926>, printed Apr. 19, 2011, 36 pages.

Hua, K.A. et al., "Video Delivery Technologies for Large-Scale Deployment of Multimedia Applications," Proceedings of The IEEE, vol. 92, No. 9, Sep. 2004, pp. 1439-1451, 13 pages.

Kasenna, "Deploying Network-Based PVR Services," Sep. 2004, copyright 2004, Kasenna, Inc., found at <http://www.kasenna.com/downloads/white_papers/Kasenna_NPVR_TimelessTV_White_Paper.pdf>, pp. 1-12.

"RTP, Real-time Transport Protocol," at <http://www.networksorcery.com/enp/protocol/rtp.htm>, copyright 1998-2011, Network Sorcery, Inc., printed Apr. 19, 2011, 13 pages.

"LimeWire User Manual," copyright 2000-2005 limewire, 24 pages.

Ripeanu et al., "Mapping the Gnutella Network: Properties of Large-Scale Peer-to-Peer Systems and Implications for System Design," University of Chicago, 2003, 12 pages.

* cited by examiner

| | Title | Artist | Album | Genre | Year | Play Count | Score |
|---|---|---|---|---|---|---|---|
| [B] 104-1 | Rebel Yell | Billy Idol | Rebel Yell | Punk | 1983 | 2 | 94 |
| [A] 104-2 | Something More | Sugarland | Twice the Speed of Life | Country | 2005 | 12 | 91 |
| [A] 104-3 | Heart of the Night | Poco | Legend | Rock | 1978 | 11 | 86 |
| [B][C] 104-4 | Still Loving You | Scorpions | Love at First Sting | Metal | 1984 | 2 | 84 |
| | ... | ... | ... | ... | ... | ... | ... |

*FIG. 3E*

REMOTE PARTICIPATION IN A LOCAL AREA NETWORK (LAN) BASED MEDIA AGGREGATION NETWORK

RELATED APPLICATIONS

This application claims the benefit of provisional patent application Ser. No. 61/149,202, filed Feb. 2, 2009, the disclosure of which is hereby incorporated herein by reference in its entirety.

FIELD OF THE INVENTION

The present disclosure relates to remote participation in a Local Area Network (LAN) based media aggregation network.

BACKGROUND

With the advent of portable media players, such as the Apple® iPod® portable media players, digital media has become prolific. However, even though user media collections of many users include hundreds if not thousands of media items, no one user owns every media item. As such, users often desire to share their media collections. For example, the Apple® iTunes® media player allows users to share their media collections with up to five users on the same subnetwork. In the Apple® iTunes® media player, the sharing user must designate what portion of their media collection to share (e.g., the entire media collection, two or more songs, or a playlist). However, users with which the media collection is shared are limited by the fact that the shared media collection is disjoint from their own media collection. Another issue is that sharing is limited to users in the same subnetwork. Thus, there is a need for an improved system and method for sharing media collections.

A Local Area Network (LAN) based media collection aggregation system that addresses these issues is described in U.S. patent application Ser. No. 12/211,895, entitled SYSTEM AND METHOD FOR ENHANCED SMART PLAYLISTS WITH AGGREGATED MEDIA COLLECTIONS, which was filed on Sep. 17, 2008 and U.S. patent application Ser. No. 12/251,490, entitled SOURCE INDICATORS FOR ELEMENTS OF AN AGGREGATE MEDIA COLLECTION IN A MEDIA SHARING SYSTEM, which was filed on Oct. 15, 2008, both of which are hereby incorporated herein by reference in their entireties. However, one issue with the described LAN based media collection aggregation system is that participation is limited to those nodes that are within the LAN. As such, there is a need for a LAN based media collection aggregation system that enables remote participation.

SUMMARY OF THE DETAILED DESCRIPTION

Systems and methods relating to a Media Collection Aggregation System (MCAS) are provided. In one embodiment, a number of nodes are connected over a Local Area Network (LAN) to provide an ad-hoc MCAS network. At least some of the nodes in the MCAS network share locally stored media collections, or select subsets thereof, with the other nodes in the MCAS network. Each node in the MCAS network selects and aggregates one or more of the shared media collections to provide an aggregate media collection for that node. One of the nodes in the MCAS network is a proxy node that provides a proxy service that enables remote participation in the MCAS network. More specifically, in one embodiment, the proxy node enables one or more remote nodes to passively and/or actively participate in the MCAS network. Passive participation in the MCAS network includes browsing and/or searching an aggregate media collection including one or more of the shared media collections in the MCAS network, one or more of the shared media collections in the MCAS network individually, or both. In addition, passive participation may include selection of one or more media items shared in the MCAS network for an on-the-fly playlist that may thereafter be utilized when, for example, the remote node joins the MCAS network or another MCAS network. Active participation in the MCAS network includes the ability to play media items shared in the MCAS network via, for example, streaming.

In another embodiment, a number of nodes are connected over a LAN to provide an ad-hoc MCAS network. At least some of the nodes in the MCAS network share locally stored media collections, or select subsets thereof, with the other nodes in the MCAS network. Each node in the MCAS network selects and aggregates one or more of the shared media collections to provide an aggregate media collection for that node. One of the nodes in the MCAS network is a proxy node that also provides a proxy service that enables remote participation in the MCAS network for remote nodes that are outside of the LAN. In this embodiment, a mobile node in the MCAS network is enabled to synchronize a context of another node in the MCAS to the mobile device. The context preferably includes an aggregation context of the other node as well as a playback context of the other node. Thereafter, when the mobile node is outside the LAN over which the MCAS network is formed, the mobile node is enabled to re-create the context of the node that has been synchronized to the mobile node by remotely participating in the MCAS network via the proxy node. In this manner, a user may, for example, seamlessly continue a playback experience after leaving the LAN over which the MCAS network is formed.

In another embodiment, a number of nodes are connected over a LAN to provide an ad-hoc MCAS network. At least some of the nodes in the MCAS network share locally stored media collections, or select subsets thereof, with the other nodes in the MCAS network. Each node in the MCAS network selects and aggregates one or more of the shared media collections to provide an aggregate media collection for that node. In this embodiment, a mobile device in the MCAS network is enabled to synchronize a playback context of another node in the MCAS network to the mobile device. Thereafter, when the mobile node leaves the MCAS network and enters another MCAS network, the mobile device re-creates the playback context.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 3A through 3E illustrate an exemplary Graphical User Interface (GUI) for presenting an aggregate media collection to a user of one of the nodes in the MCAS network of FIG. 2 according to one embodiment of the present disclosure;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1A:
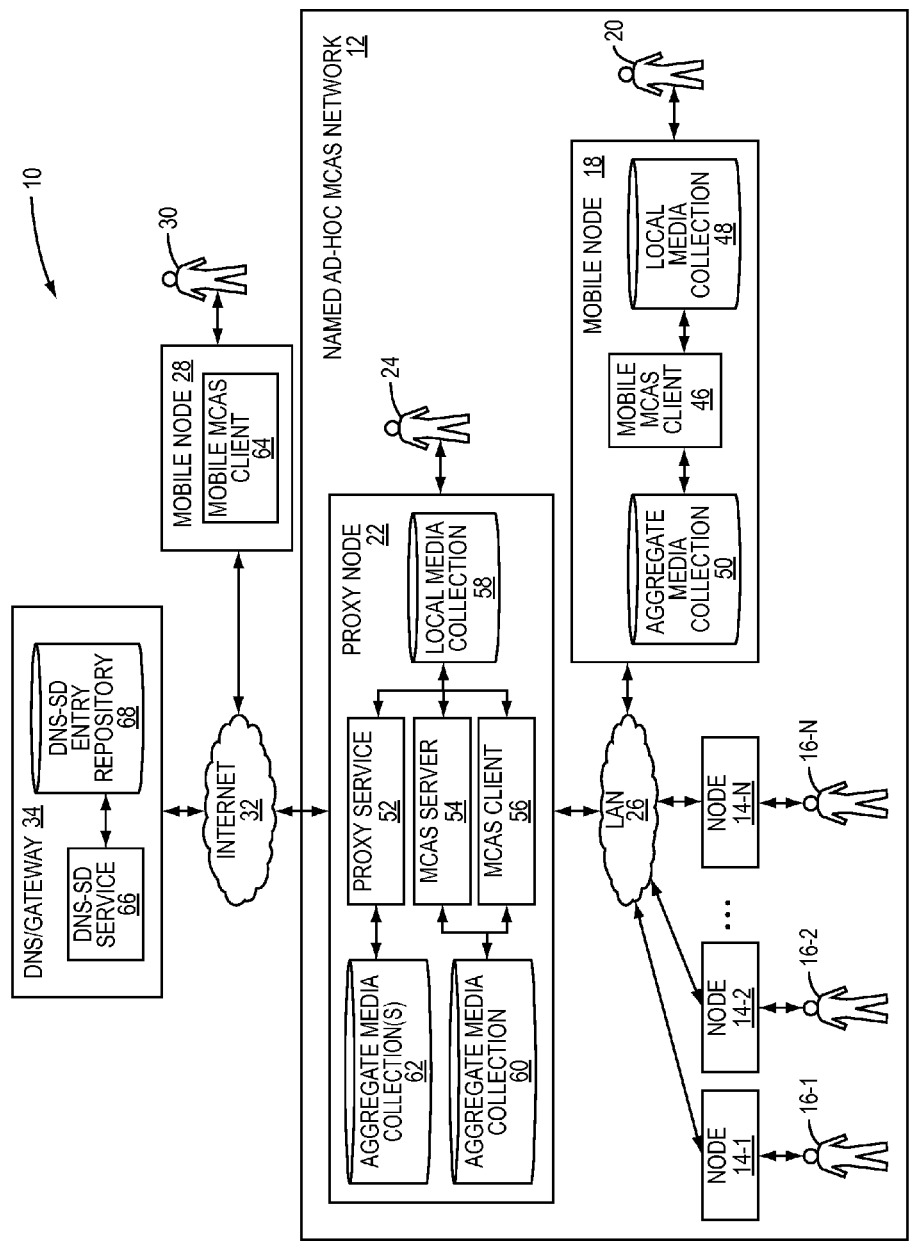
FIGS. 1A and 1B illustrate a Media Collection Aggregation System (MCAS) according to one embodiment of the present disclosure.

FIG. 1A illustrates a Media Collection Aggregation System (MCAS) 10 (hereinafter "system 10") according to one embodiment of the present disclosure. In general, the system 10 includes a named ad-hoc MCAS network 12 (hereinafter "MCAS network 12") formed by a number of nodes 14-1 through 14-N having associated users 16-1 through 16-N, a mobile node 18 having an associated user 20, and a proxy node 22 having an associated user 24. The nodes 14-1 through 14-N, the mobile node 18, and the proxy node 22 are connected via a Local Area Network (LAN) 26 and are part of the same subnetwork. In addition, as discussed below in detail, the proxy node 22 enables remote participation in the MCAS network 12 for one or more remote nodes, such as a mobile node 28 having an associated user 30, via the Internet 32. Note that while the Internet 32 is utilized in this embodiment of the system 10, any distributed global network or any Wide Area Network (WAN) may alternatively be used to provide remote participation in the MCAS network 12. Lastly, in this embodiment, a Domain Name Server (DNS)/gateway 34 operates to enable remote nodes to discover MCAS networks, such as the MCAS network 12. Note that while only one MCAS network 12 is illustrated for clarity, the system 10 may include any number of MCAS networks 12.

Figure 1B:
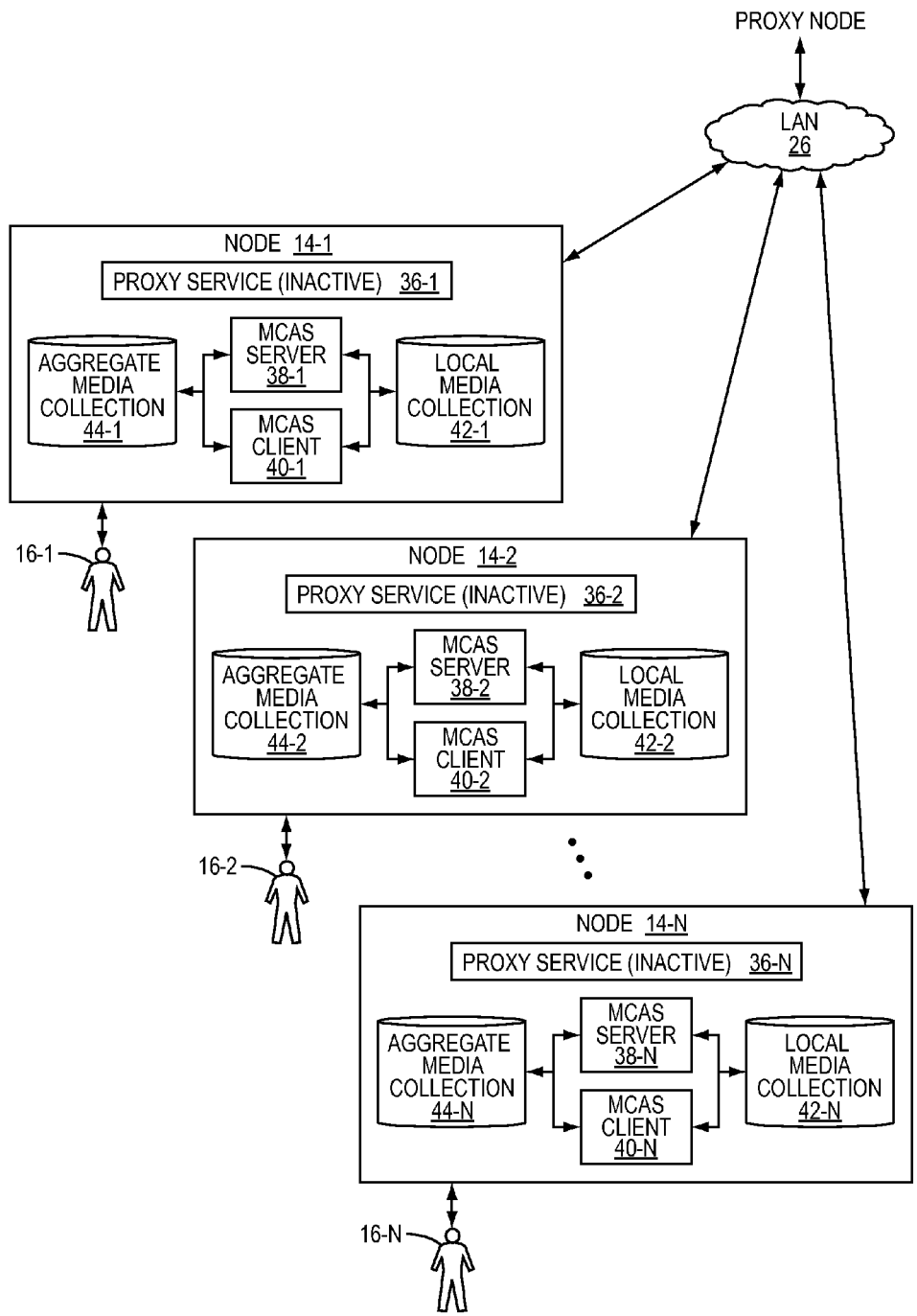

Each of the nodes 14-1 through 14-N is a user device such as, for example, a personal computer, a laptop computer, a set-top box, or the like. Looking at the node 14-1, as illustrated in FIG. 1B, the node 14-1 includes a proxy service 36-1, an MCAS server 38-1, and an MCAS client 40-1, each of which is preferably implemented in software but is not limited thereto. Note that while shown separately, the proxy service 36-1, the MCAS server 38-1, and MCAS client 40-1 may be implemented as a single software application, be implemented within another software application such as, for example, a media player application, or be implemented as a plug-in for a media player application. Together, the MCAS server 38-1 and the MCAS client 40-1 may also be referred to herein as an aggregation function. The proxy service 36-1 of the node 14-1 generally enables the node 14-1 to operate as the proxy node 22 of the MCAS network 12 if so desired. In this example, the node 14-1 is not selected as the proxy node 22 and, as such, the proxy service 36-1 of the node 14-1 is inactive.

The MCAS server 38-1 generally operates to share a local media collection 42-1, or a select portion thereof, within the MCAS network 12 as a shared media collection. The local media collection 42-1 includes a number of media items to which the user 16-1 has access rights (e.g., media items that the user 16-1 has purchased). The media items are preferably songs. However, the media items may include one or more audio items such as, for example, songs, podcasts, or audio books; one or more video items such as, for example, movies, television programs, or video clips; or the like. In order to share the shared media collection of the node 14-1 with the MCAS network 12, the MCAS server 38-1 shares metadata identifying media items in the shared media collection of the node 14-1 and serves streaming requests for the media items in the shared media collection of the node 14-1.

The MCAS client 40-1 generally operates to discover shared media collections within the MCAS network 12 and aggregate two more media collections to provide an aggregate media collection 44-1 for the user 16-1 of the node 14-1. The two or more media collections aggregated to provide the aggregate media collection 44-1 for the user 16-1 are either: (1) the local media collection 42-1 of the node 14-1 plus one or more of the shared media collections in the MCAS network 12 or (2) two or more of the shared media collections in the MCAS network 12. The aggregate media collection 44-1 does not include media items. Rather, the aggregate media collection 44-1 is data identifying the media items forming the aggregate media collection 44-1 as well as information identifying one or more sources of each of the media items forming the aggregate media collection 44-1 in the MCAS network 12. The data identifying the media items forming the aggregate media collection 44-1 may be Globally Unique Identifiers (GUIDs) of the media items and/or media item type specific metadata identifying the media item. For example, for a song, the data identifying the song may be a combination of artist, album, title, or the like. The information identifying the one or more sources of each of the media items in the aggregate media collection 44-1 may be, for example, Uniform Resource Locators (URLs). For example, for a media item in the shared media collection of the node 14-N, the information identifying the node 14-N as a source of the media item may be a URL for the media item at the node 14-N that enables streaming of the media item from the node 14-N to the node 14-1 upon request. As another example, for a media item in the local media collection 42-1 of the node 14-1, the information identifying the local media collection 42-1 as a source for the media item may be a URL that enables playback of the media item from the local media collection 42-1.

In addition to discovering the shared media collections and generating the aggregate media collection 44-1, the MCAS client 40-1 enables the user 16-1 to utilize the aggregate media collection 44-1. More specifically, the MCAS client 40-1 enables the user 16-1 to consume media items in the aggregate media collection 44-1 (i.e., listen to songs in the aggregate media collection 44-1 and/or watch videos in the aggregate media collection 44-1). Still further, the MCAS client 40-1 enables the user 16-1 to create playlists of media items in the aggregate media collection 44-1, browse the aggregate media collection 44-1, search the aggregate media collection 44-1, or the like.

Like the node 14-1, the other nodes 14-2 through 14-N also include proxy services 36-2 through 36-N, MCAS servers 38-2 through 38-N, and MCAS clients 40-2 through 40-N, respectively. As discussed above, the proxy services 36-2 through 36-N are inactive because the nodes 14-2 through 14-N are not serving as the proxy node 22 of the MCAS network 12. The MCAS servers 38-2 through 38-N generally operate to share local media collections 42-2 through 42-N, or select subsets thereof, to provide corresponding shared media collections for the MCAS network 12. The MCAS clients 40-2 through 40-N generally operate to discover shared media collections in the MCAS network 12, generate aggregate media collections 44-2 through 44-N for the users 16-2 through 16-N of the nodes 14-2 through 14-N, and enable the users 16-2 through 16-N to utilize the aggregate media collections 44-2 through 44-N.

Returning to FIG. 1A, the mobile node 18 is a mobile user device such as, for example, a mobile smart phone (e.g., Apple® iPhone), a portable media player (e.g., an Apple® iPod Touch®), a netbook or tablet computer, a laptop computer, or the like. In this embodiment, the mobile node 18 includes a mobile MCAS client 46, a local media collection 48, and an aggregate media collection 50. The local media collection 48 includes a number of media items to which the user 20 has access rights (e.g., media items that the user 20 has purchased). The media items are preferably songs. However, the media items may include one or more audio items such as, for example, songs, podcasts, or audio books; one or more video items such as, for example, movies, television programs, or video clips; or the like.

The mobile MCAS client 46 is preferably implemented in software but is not limited thereto. The mobile MCAS client 46 generally operates to discover shared media collections in the MCAS network 12 and generate the aggregate media collection 50 for the user 20 in a manner similar to that described herein with respect to the MCAS clients 40-1 through 40-N of the nodes 14-1 through 14-N. The mobile MCAS client 46 also enables the user 20 to utilize the aggregate media collection 50 by consuming (i.e., listening to or watching) media items in the aggregate media collection 50, creating playlists of media items from the aggregate media collection 50, browsing the aggregate media collection 50, searching the aggregate media collection 50, or the like. Again, note that the aggregate media collection 50 does not include media items. Rather, the aggregate media collection 50 is data that identifies the media items forming the aggregate media collection 50 as well as data identifying one or more sources of each of the media items forming the aggregate media collection 50 in the MCAS network 12.

Note that in this embodiment, the mobile node 18 does not include a MCAS server. However, if the mobile node 18 has sufficient network and computing resources, the mobile node 18 may also include a MCAS server that enables the mobile node 18 to share the local media collection 48, or a select subset thereof, in the MCAS network 12. Still further, if the mobile node 18 has sufficient network and computing resources, the mobile node 18 may also include a proxy service that would enable the mobile node 18 to operate as the proxy node 22 for the MCAS network 12 if so desired. However, due to the mobility of the mobile node 18, it may not be desirable for the mobile node 18 to be selected as the proxy node 22 for the MCAS network 12. Lastly, in this embodiment, the mobile node 18 generates and stores the aggregate media collection 50 of the user 20. However, in an alternative embodiment, the proxy node 22 may generate and store the aggregate media collection 50 on behalf of the mobile node 18, particularly if the mobile node 18 has limited network and/or computing resources. The mobile node 18 may then obtain data from the aggregate media collection 50 hosted by the proxy node 22 as needed.

The proxy node 22 is a user device such as, for example, a personal computer, a laptop computer, a set-top box, or the like. In the preferred embodiment, the proxy node 22 was originally one of the nodes 14-1 through 14-N and was selected to serve as the proxy node 22 for the MCAS network 12, at which point it became the proxy node 22. The proxy node 22 includes a proxy service 52, an MCAS server 54, and an MCAS client 56. The proxy service 52, the MCAS server 54, and the MCAS client 56 are preferably implemented in software, but are not limited thereto. Note that while shown separately, the proxy service 52, the MCAS server 54, and the MCAS client 56 may be implemented as a single software application, be implemented within another software application such as, for example, a media player application, or be implemented as a plug-in for a media player application. Together, the MCAS server 54 and the MCAS client 56 may also be referred to herein as an aggregation function.

The proxy service 52 of the proxy node 22 is active and generally operates to register the MCAS network 12 with the DNS/gateway 34 and enable remote participation in the MCAS network 12 for one or more remote nodes, such as the mobile node 28. As discussed below in detail, remote participation includes passive participation such as, for example, browsing and/or searching an aggregate media collection including two or more shared media collections in the MCAS network 12, browsing and/or searching one or more of the shared media collections in the MCAS network 12 individually, or the like. In addition, remote participation may include active participation, which includes playback of media items from the MCAS network 12. In addition to enabling remote participation in the MCAS network 12, the proxy service 52 may also enable remote nodes to query the proxy service 52 to obtain dynamic data regarding the MCAS network 12 such as, for example, a total number of users or nodes participating in the MCAS network 12, a total number of shared media collections in the MCAS network 12, a total number of media items shared in the MCAS network 12, statistical information regarding the media items shared in the MCAS network 12, or the like. The statistical information may include, for example, a statistical distribution of songs shared in the MCAS network 12 over a number of song categories such as, for example, music genres, music artists, decades of release, or the like.

The MCAS server 54 and the MCAS client 56 of the proxy node 22 operate the same as the MCAS servers 38-1 through 38-N and the MCAS clients 40-1 through 40-N of the nodes 14-1 through 14-N. More specifically, the MCAS server 54 generally operates to share a local media collection 58, or a select subset thereof, to provide a corresponding shared media collection for the MCAS network 12. The local media collection 58 includes a number of media items to which the user 24 has access rights (e.g., media items that the user 24 has purchased). The media items are preferably songs. However, the media items may include one or more audio items such as, for example, songs, podcasts, or audio books; one or more video items such as, for example, movies, television programs, or video clips; or the like. The MCAS client 56 generally operates to discover shared media collections in the MCAS network 12, generate an aggregate media collection 60 for the user 24 of the proxy node 22, and enable the user 24 to utilize the aggregate media collection 60. The aggregate media collection 60 does not include media items. Rather, the aggregate media collection 60 is data identifying the media items forming the aggregate media collection 60 as well as information identifying one or more sources of each of the media items forming the aggregate media collection 60 in the MCAS network 12.

Lastly, the proxy node 22 may include one or more aggregate media collections 62 hosted for remote nodes that are remotely participating in the MCAS network 12. The aggregate media collections 62 may be particularly beneficial for mobile nodes, such as the mobile node 28, having relatively low bandwidth connections to the Internet 32. The aggregate media collections 62 are maintained by the proxy node 22 on behalf of the corresponding remote nodes and data from the aggregate media collections 62 is then provided to the remote nodes as needed.

The mobile node 28 is a mobile user device such as, for example, a mobile smart phone, portable media player, or the like having network capabilities. The mobile node 28 includes a mobile MCAS client 64. While not illustrated, the mobile node 28 may optionally include a local media collection. Further, in this embodiment, when remotely participating in the MCAS network 12, an aggregate media collection of the mobile node 28 is preferably hosted by the proxy node 22 as one of the aggregate media collections 62. However, in an alternative embodiment, the aggregate media collection 62 of the mobile node 28 may be stored by the mobile node 28 when the mobile node 28 is remotely participating in the MCAS network 12.

The DNS/gateway 34 is generally referred to herein as a centralized server providing WAN based service discovery. In this embodiment, the DNS/gateway 34 includes a DNS-Service Discovery (DNS-SD) service 66 and a DNS-SD entry repository 68. While the DNS/gateway 34 is a physical device or system, the DNS-SD service 66 may be implemented in software, hardware, or a combination thereof. With respect to the system 10, the DNS-SD service 66 operates to maintain DNS-SD entries for a number of MCAS networks, including the MCAS network 12, in the DNS-SD entry repository 68. In general, the proxy service 52 of the proxy node 22 registers the MCAS network 12 with the DNS-SD service 66 as an MCAS network providing a MCAS service. Note that in order to be registered with the DNS-SD service 66, the MCAS network 12 is a named network. In the preferred embodiment, WAN Bonjour is used for service discovery. As such, the name of the MCAS network 12 is preferably a Bonjour domain name. The Bonjour domain name may be a global service registration zone maintained by an MCAS application provider, e.g., mcas.companyname.com, or there may be an option to input a specific Bonjour domain maintained by a local entity such as, for example, a university, city, company, or the like or maintained in a more federated fashion such as by user group.

As a result of registering the MCAS network 12 with the DNS-SD service 66, a DNS-SD entry for the MCAS network 12 is created and stored in the DNS-SD entry repository 68. The DNS-SD entry for the MCAS network 12 enables remote nodes, such as the mobile node 28, to discover the MCAS network 12 and connect to the proxy node 22 for remote participation in the MCAS network 12. An exemplary DNS-SD entry for the MCAS network 12 is:

_MCAS_proxy._tcp PTR University FloMo MCAS Network._MCAS-proxy._tcp

University FloMo MCAS Network._MCAS_proxy._tcp TXT lat:37.422128, long: −122.171757

University FloMo MCAS Network._MCAS_proxy._tcp 86400 IN SRV 0 5 5555 MCASproxy.flomo.university.edu, where University FloMo MCAS Network._MCAS_proxy._tcp is the service name provided by the proxy node 22 of the MCAS network 12. The DNS-SD entry indicates that the proxy node 22 provides a MCAS proxy service using Transmission Control Protocol (TCP) and that the proxy node 22 can be connected to using the domain name or URL MCASproxy.flomo.university.edu at port number 5555. Also note that, in this exemplary embodiment, the location of the MCAS network 12 is included in the DNS-SD entry as latitude and longitude coordinates using a TXT field of the DNS-SD entry. The location of the MCAS network 12 may be obtained using any suitable technique. For example, the proxy node 22 may be a location-aware device (e.g., the proxy node 22 may include a Global Positioning System (GPS) receiver or the user 24 may manually define the location of the proxy node 22). Further, while latitude and longitude coordinates are used for this example, other data may be used to represent the location of the MCAS network 12 such as, for example, a street address, a zip code, or the like.

Figure 2:
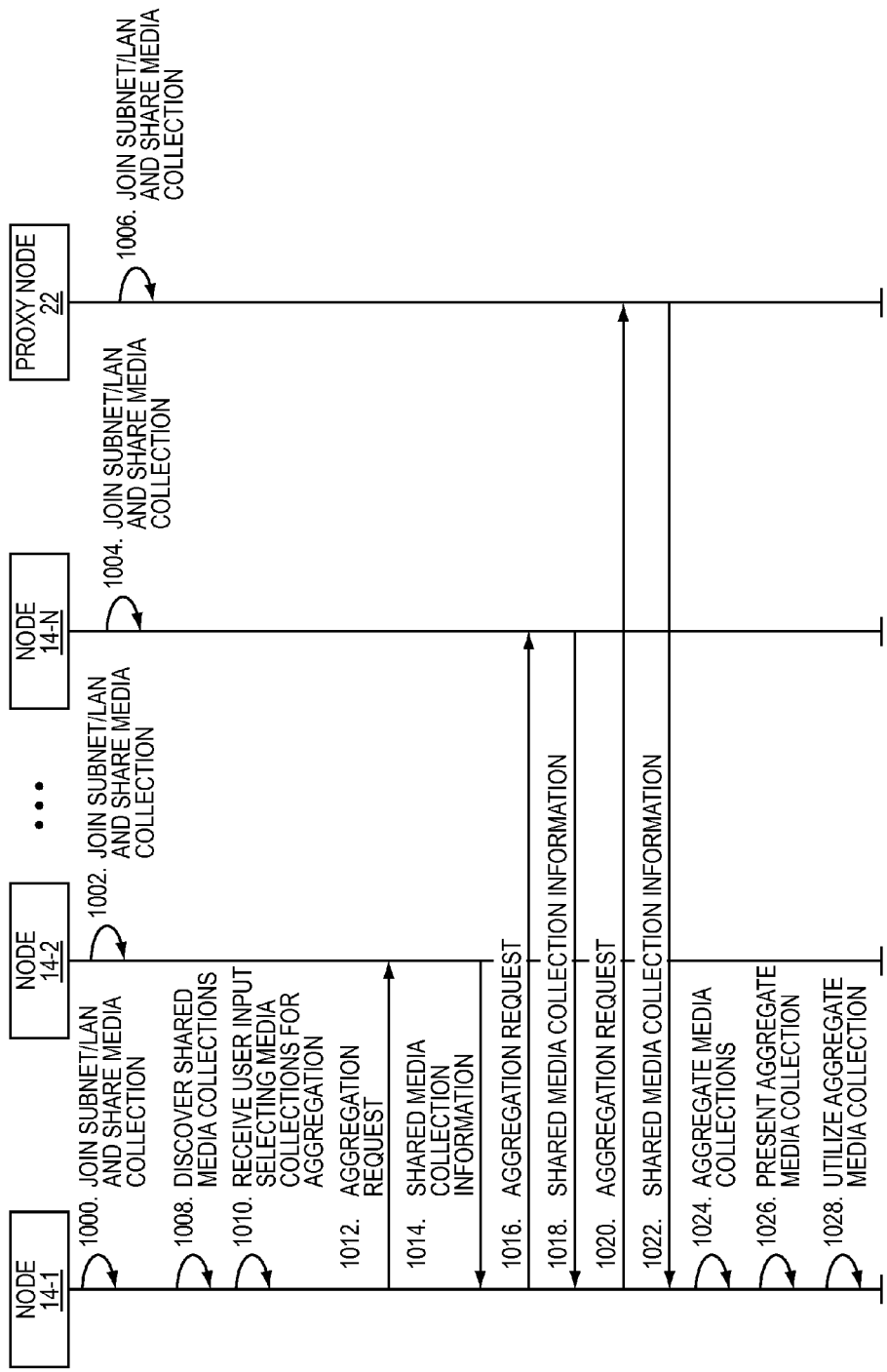
FIG. 2 illustrates the operation of the system of FIG. 1 to enable aggregation of shared media collections in a Local Area Network (LAN) based ad-hoc MCAS network according to one embodiment of the present disclosure.

Before describing aspects of the present disclosure relating to remote participation in the MCAS network 12, a description of the operation of the MCAS network 12 is beneficial. FIG. 2 illustrates the operation of the MCAS network 12 according to one embodiment of the present disclosure. First, the nodes 14-1 through 14-N and the proxy node 22 join the LAN 26 and share the shared media collections of the users 16-1 through 16-N and 24, respectively (steps 1000 through 1006). More specifically, in one embodiment, the MCAS servers 38-1 through 38-N of the nodes 14-1 through 14-N and the MCAS server 54 of the proxy node 22 all broadcast a media collection sharing service over the LAN 26 via Bonjour or a similar service discovery protocol.

Next, using the node 14-1 as an example, the MCAS client 40-1 discovers the shared media collections shared by the other nodes 14-2 through 14-N and the proxy node 22 (step 1008). For example, if Bonjour or a similar protocol is used, the MCAS client 40-1 listens for broadcasts of a media sharing service from other nodes in the MCAS network 12. In this embodiment, the MCAS client 40-1 presents a list of the media collections including the local media collection 42-1 of the user 16-1 and the shared media collections of the users 16-2 through 16-N and 24 to the user 16-1 at the node 14-1.

Then, the MCAS client 40-1 receives user input from the user 16-1 selecting one or more of the media collections for aggregation (step 1010). In this example, the user 16-1 selects the local media collection 42-1 of the user 16-1 and the shared media collections of the users 16-2 and 16-N and 24, which are hosted by the nodes 14-2 and 14-N and the proxy node 22, respectively.

The MCAS client 40-1 of the node 14-1 then issues an aggregation request to the node 14-2 of the user 16-2 (step 1012). In response, in this embodiment, the MCAS server 38-2 of the node 14-2 returns information, which is also referred to herein as shared media collection information, identifying media items in the shared media collection of the user 16-2 to the node 14-1 of the user 16-1 (step 1014). Likewise, MCAS client 40-1 of the node 14-1 issues an aggregation request to the node 14-N of the user 16-N (step 1016). In response, the MCAS server 38-N of the node 14-N returns information, which is also referred to herein as shared media collection information, identifying media items in the shared media collection of the user 16-N to the node 14-1 of the user 16-1 (step 1018). The MCAS client 40-1 of the node 14-1 also issues an aggregation request to the proxy node 22 of the user 24 (step 1020). In response, the MCAS server 54 of the proxy node 22 returns media information, which is also referred to herein as shared media collection information, identifying media items in the shared media collection of the user 24 to the node 14-1 of the user 16-1 (step 1022).

Upon receiving the shared media collection information, the MCAS client 40-1 of the node 14-1 aggregates or merges the local media collection 42-1 of the user 16-1 and the shared media collections selected by the user 16-1 to provide the aggregate media collection 44-1 of the user 16-1 (step 1024). More specifically, in one embodiment, the MCAS client 40-1 of the node 14-1 aggregates the shared media collection information and information identifying the media items in the local media collection 42-1 of the user 16-1 to provide a list of unique media items available either from the local media collection 42-1 of the user 16-1 or one of the shared media collections selected by the user 16-1 for aggregation. In addition, for each unique media item, a secondary list of available sources for the unique media item is preferably generated. Together, the list of unique media items and the corresponding secondary lists of sources for the unique media items form the aggregate media collection 44-1 of the user 16-1. For more information, the interested reader is directed to commonly owned and assigned U.S. Patent Application Publication No. 2009/0265426, entitled METHOD AND SYSTEM FOR AGGREGATING MEDIA COLLECTIONS BETWEEN PARTICIPANTS OF A SHARING NETWORK, which was filed on Apr. 17, 2008 and published on Oct. 22, 2009 and is hereby incorporated herein by reference in its entirety. Note that while the discussion herein focuses on an embodiment where the shared media collections are aggregated with the local media collection 42-1 of the user 16-1, the present disclosure is not limited thereto. The user 16-1 may choose not to select his local media collection 42-1 for aggregation, in which case two or more shared media collections would be selected for aggregation and aggregated with one another to provide the aggregate media collection 44-1 of the user 16-1.

The aggregate media collection 44-1 of the user 16-1 may also include an aggregate list of playlists, or aggregate playlists. More specifically, the local media collection 42-1 of the user 16-1 as well as the shared media collections selected by the user 16-1 for aggregation may include static or dynamic playlists. Information identifying the playlists may then be included within or provided in association with the shared media collection information. Then, when generating the aggregate media collection 44-1 of the user 16-1, the MCAS client 40-1 of the node 14-1 may also aggregate the playlists of the shared media collections selected by the user 16-1 and the playlists in the local media collection 42-1 of the user 16-1. When aggregating playlists, a list of unique playlists may be generated. As used herein, a unique playlist is a playlist having a unique title. Playlists having the same title may be combined or merged. For example, an "80s" playlist of the user 16-1 may be combined with an "80s" playlist of the user 16-2 to provide an aggregate "80s" playlist including both the media items from the "80s" playlist of the user 16-1 and the media items from the "80s" playlist of the user 16-2.

Once the aggregate media collection 44-1 of the user 16-1 is generated, the aggregate media collection 44-1 is presented to the user 16-1 via, for example, a Graphical User Interface (GUI) (step 1026). In one embodiment, source indicators may be included in the GUI, where each source indicator is presented in association with a corresponding element of the aggregate media collection 44-1 and operates to identify a source for that element of the aggregate media collection 44-1. The source of an element of the aggregate media collection 44-1 may be the local media collection 42-1 of the user 16-1 or one of the shared media collections selected by the user 16-1 for aggregation. As used herein, an element of the aggregate media collection 44-1 may be a playlist in the aggregate media collection 44-1 or a unique media item in the aggregate media collection 44-1.

At this point, the user 16-1 may utilize the aggregate media collection 44-1 in much the same manner as using the local media collection 42-1 (step 1028). For example, via the MCAS client 40-1, the user 16-1 may select media items from the aggregate media collection 44-1 for playback, generate playlists including media items from the aggregate media collection 44-1, generate smart or dynamic playlists that are populated from the aggregate media collection 44-1, play media items in an existing playlist, or the like. In one embodiment, in order to provide playback of a media item that is from a shared media collection of another user, the media item is requested from the node hosting the shared media collection and streamed from that node to the node 14-1 of the user 16-1. For example, if the user 16-1 initiates playback of a media item and that media item's source is the shared media collection hosted by the node 14-2, the MCAS client 40-1 of the node 14-1 requests the media item from the node 14-2. In response, the MCAS server 38-2 of the node 14-2 delivers the media item to the MCAS client 40-1 of the node 14-1 for playback. In the preferred embodiment, the media item is delivered via streaming.

FIGS. 3A through 3E illustrate an exemplary GUI 70 for presenting an aggregate media collection to a user according to one embodiment of the present disclosure. In this example, the GUI 70 is provided by the MCAS client 40-1 of the node 14-1. Note that in this exemplary embodiment, the media items shared via the system 10 are songs. However, as discussed above, the present disclosure is not limited thereto.

Figure 3A:
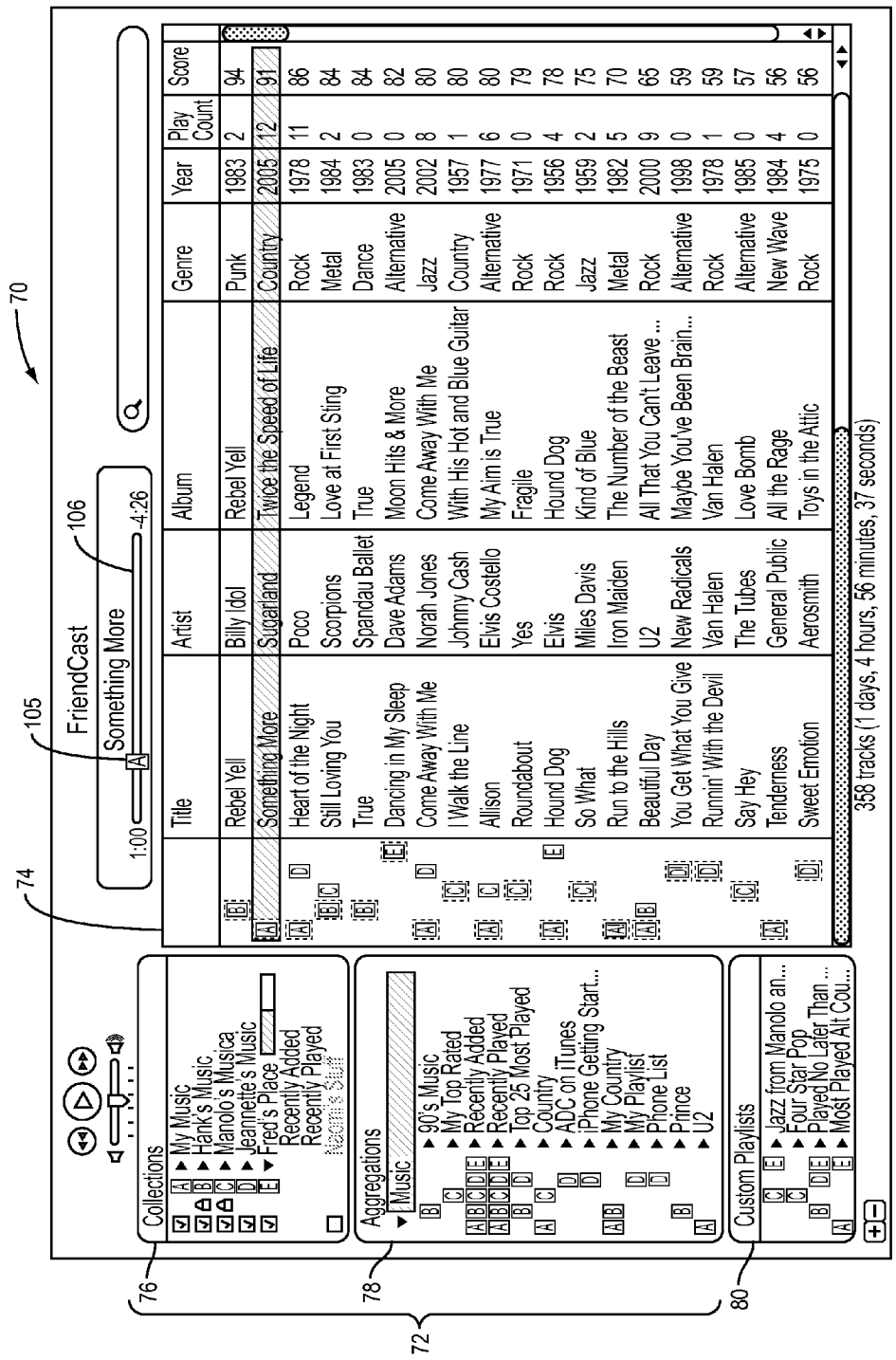

As shown in FIG. 3A, the GUI 70 includes a navigation area 72 and a display area 74. The navigation area 72 generally enables the user, which in this example is the user 16-1, to select media collections to be aggregated as well as to navigate his aggregate media collection 44-1. The navigation area 72 includes a media collection selection area 76 and a playlist selection area 78. The media collection selection area 76 is used to present a list of media collections available to the user 16-1 and to enable the user 16-1 to select two or more of the media collections for aggregation. In this example, the list of media collections available to the user 16-1 includes the local media collection 42-1 of the user 16-1, which has the title "My Music," and five shared media collections having the titles "Hank's Music," "Manolo's Musica," "Jeannette's Music," "Fred's Place," and "Naomi's Stuff." In this example, the user 16-1 has selected his local media collection 42-1 having the title "My Music" and the shared media collections having the titles "Hank's Music," "Manolo's Musica," "Jeannette's Music," and "Fred's Place" for aggregation. Note that the maximum number of collections that may be selected for aggregation may be limited. For example, the system 10 may limit the number of shared media collections that a user may select for aggregation to five (5).

In this embodiment, each of the media collections selected for aggregation is assigned a unique source identifier. In this example, the source identifiers are alphabetic letters (A, B, C, etc.), but are not limited thereto. Any type of indicator enabling the user 16-1 to visually distinguish sources of elements of his aggregate media collection 44-1 may be used. For example, in another embodiment, each of the media collections selected for aggregation, which are also referred to herein as sources, may be assigned a unique color. The colors may then be used as source indicators by placing corresponding colored blocks or boxes next to the corresponding elements of the aggregate media collection 44-1 and/or by using text of the corresponding colors for the corresponding elements of the aggregate media collection 44-1.

The playlist selection area 78 generally enables the user 16-1 to navigate his aggregate media collection 44-1. In this example, the aggregate media collection 44-1 is an aggregate music collection. Thus, by selecting the "Music" identifier in the playlist selection area 78, a list of the unique songs in the aggregate media collection 44-1 of the user 16-1 is presented in the display area 74. Further, in this example, the "Music" identifier is hierarchical. In other words, the "Music" identifier may be expanded as shown to view a list of aggregate playlists in the aggregate media collection 44-1 of the user 16-1. Note that source identifiers are presented in association with each aggregate playlist to indicate the source or sources of media items in the aggregate playlist. In addition, the GUI 70 includes a custom playlists area 80. The custom playlists area 80 enables the user 16-1 to define static or dynamic playlists created specifically for the aggregate media collection 44-1.

Figure 3B:
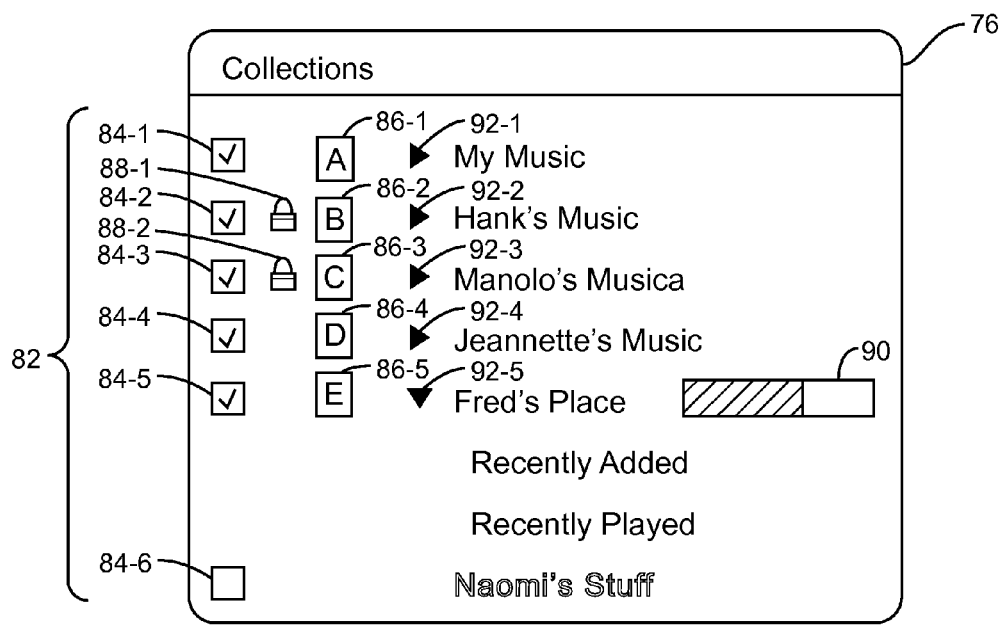

FIG. 3B is a blow-up of the media collection selection area 76 of FIG. 3A. As shown, the media collection selection area 76 includes a list of media collections 82 available to the user 16-1. The user 16-1 is enabled to select desired media collections for aggregation via corresponding check boxes 84-1 through 84-6. In this example, the user 16-1 has selected his local media collection 42-1, which is titled "My Music," and the shared media collections "Hank's Music," Manolo's Musica," "Jeannette's Music," and "Fred's Place" by activating the corresponding check boxes 84-1 through 84-5. Note that, in this example, the user 16-1 is limited to selecting at most five (5) media collections for aggregation. As such, since five (5) media collections have been selected, the shared media collection "Naomi's Stuff" is grayed-out and cannot be selected by the user 16-1 unless the user 16-1 deselects one of the other selected media collections. Note that the maximum number of media collections that may be selected is preferably a system-defined limit. However, in an alternative embodiment, the user 16-1 may be enabled to define the maximum number of media collections that may be aggregated.

Further, unique source indicators 86-1 through 86-5 (hereinafter source indicators 86-1 through 86-5) are assigned to the media collections selected for aggregation. In this example, the source indicators 86-1 through 86-5 are the letters A, B, C, D, and E positioned inside boxes. However, the present disclosure is not limited thereto. For example, the source indicators 86-1 through 86-5 may alternatively be colors. As discussed below, the source indicators 86-1 through 86-5 are presented in association with elements of the aggregate media collection 44-1 of the user 16-1 in order to identify the source or sources for the elements of the aggregate media collection 44-1 of the user 16-1.

Password-protection indicators 88-1 and 88-2 indicate that the corresponding media collections are password protected. As such, the user 16-1 must enter the correct passwords for the password protected media collections before the media collections can be aggregated or, alternatively, before the user 16-1 is enabled to play the media items from the password protected media collections. A progress indicator 90 may be used to show the progress of obtaining or downloading the shared media collection information for the corresponding shared media collection. Thus, in this example, the shared media collection information for the selected shared media collections other than "Fred's Place" have already been downloaded, and the download of the shared media collection information for "Fred's Place" is still in progress.

In this example, the identifiers for the selected media collections are hierarchical. As such, hierarchical controls 92-1 through 92-5 may be used to expand the identifiers to show a number of subgroups of media items within the corresponding media collections. In this example, the subgroups are playlists. As such, using "Fred's Place" as an example, the hierarchical control 92-5 may be activated to view the playlists included in the shared media collection "Fred's Place," which are a "Recently Added" playlist and a "Recently Played" playlist.

Figure 3C:
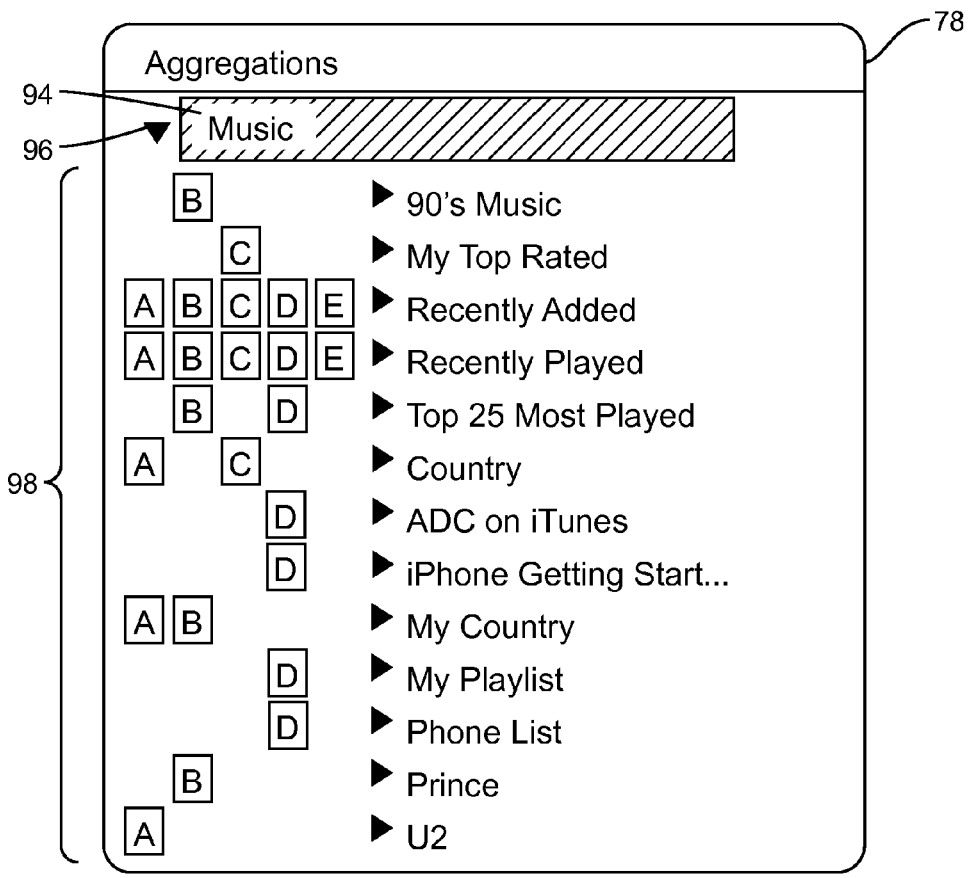

FIG. 3C is a blow-up of the playlist selection area 78. As discussed above, the playlist selection area 78 generally enables the user 16-1 to navigate his aggregate media collection 44-1. In this example, the aggregate media collection 44-1 is an aggregate music collection. Thus, by selecting a "Music" identifier 94, a list of the unique songs in the aggregate media collection 44-1 of the user 16-1 is presented in the display area 74 (FIG. 3A). Further, in this example, the "Music" identifier 94 is hierarchical. As such, by selecting a hierarchical control 96, the user 16-1 can expand the "Music" identifier 94 to view a list of aggregate playlists 98 in the aggregate media collection 44-1 of the user 16-1. In this example, the aggregate playlists include a "90's Music" playlist, a "My Top Rated" playlist, etc.

In this embodiment, one or more source indicators are presented in association with each of the aggregate playlists in order to identify the source or sources of the media items in the aggregate playlists. The source indicators presented in association with the aggregate playlists correspond to the source indicators 86-1 through 86-5 (FIG. 3B) assigned to the media collections selected for aggregation. As such, the user 16-1 can easily identify which source or sources contribute to each of the aggregate playlists. For example, the "90's Music" playlist has only media items from the source identified by the "B" source indicator, which in this example is the "Hank's Music" shared media collection (FIG. 3B). As another example, the "Top 25 Most Played" playlist has media items from the sources identified by the "B" source identifier and the "D" source identifier, which in this example are the "Hank's Music" and "Jeannette's Music" shared media collections.

Figure 3D:

FIG. 3D is a blow-up of the custom playlists area 80 of FIG. 3A. One or more source indicators are presented in association with each custom playlist in a list of custom playlists 100 in order to identify the source or sources of the media items in the custom playlists. The source indicators presented in association with the custom playlists correspond to the source indicators 86-1 through 86-5 (FIG. 3B) assigned to the media collections selected for aggregation. As such, the user 16-1 can easily identify which sources contribute to each of the custom playlists. For example, the "Jazz from Manolo an . . . " playlist has only media items from the sources identified by the "C" source indicator and the "E" source indicator, which in this example are the "Manolo's Musica" and the "Fred's Place" shared media collections (FIG. 3B).

FIG. 3E illustrates a list of media items 102 presented in the display area 74 of FIG. 3A. One or more source indicators are presented in association with each media item in the list of media items 102 in order to identify the source or sources for the media items. Again, the source indicators presented in association with the media items correspond to the source indicators 86-1 through 86-5 (FIG. 3B) assigned to the media collections selected for aggregation. As such, the user 16-1 can easily identify the source or sources for each media item in the list of media items 102. For example, the song "Rebel Yell" has only one source identified by the source indicator "B," which in this example corresponds to the "Hank's Music" shared media collection. As another example, the song "Still Loving You" has two sources identified by the source indicator "B" and the source indicator "C," which in this example correspond to the "Hank's Music" and "Manolo's Musica" shared media collections. Further, indicators 104-1 through 104-4 are used to identify one source for each of the media items from which the media item is to be obtained or streamed. For example, the song "Still Loving You" is to be obtained from the user device hosting "Hank's Music," which is identified by the source indicator "B." In this example, the indicators 104-1 through 104-4 are dashed boxes placed around the source indicators of the sources from which the media items are to be obtained. However, the present disclosure is not limited thereto. Other types of indicators 104-1 through 104-4 may be used.

Returning briefly to FIG. 3A, optionally, a source indicator 105 may also be used as the thumb of a playback progress bar 106 in order to identify the source of the currently playing media item. In this example, the song "Something More" is currently playing, and the source of the song "Something More" is identified by the source indicator "A," which in this example is the local media collection 42-1 ("My Music") of the user 16-1.

Figure 4:
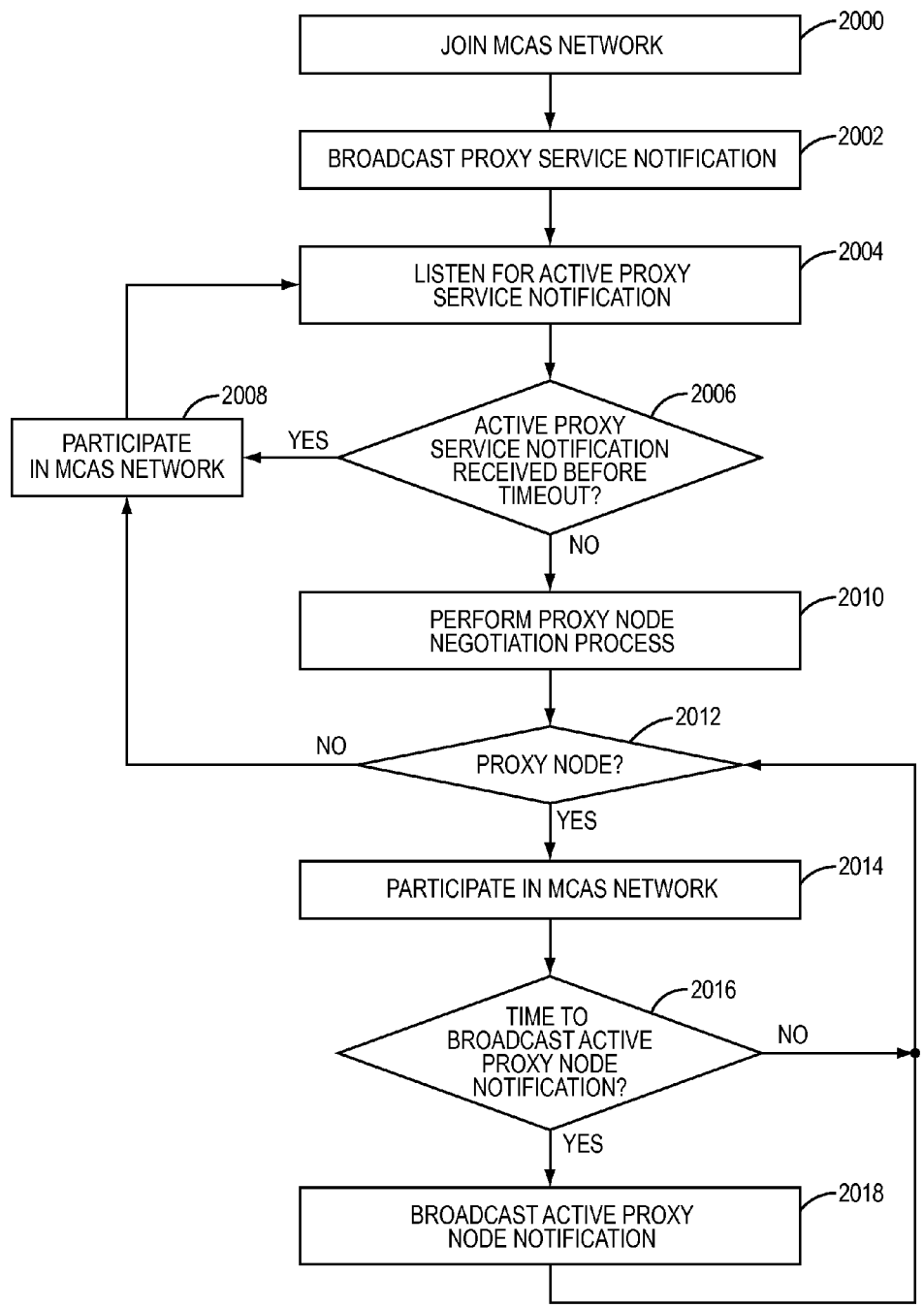
FIG. 4 illustrates a process for selecting a proxy node in the MCAS network of FIG. 1 according to one embodiment of the present disclosure.

As discussed above, the proxy node 22 of FIG. 1 enables remote participation in the MCAS network 12. FIG. 4 is a flow chart of a process for selecting a node in the MCAS network 12 as the proxy node 22 according to one embodiment of the present disclosure. In general, the MCAS network 12 includes a number of nodes, where one of the nodes is selected as the proxy node 22. Thus, referring to FIG. 1, before selection as the proxy node 22, the proxy node 22 was preferably one of the nodes 14-1 through 14-N, where each of the nodes 14-1 through 14-N is capable of operating as the proxy node 22 (i.e., each of the nodes includes a proxy service).

In this example, selection of the proxy node 22 is initiated when a node joins the MCAS network 12 as one of the nodes 14-1 through 14-N (step 2000). The node that joins the MCAS network 12 is hereinafter referred to as the joining node. Upon joining the MCAS network 12, the proxy service of the joining node is in the inactive state and operates to broadcast a proxy service notification over the LAN 26 (step 2002). The proxy service of the joining node also listens for an active proxy service notification from an active proxy service of an existing proxy node of the MCAS network 12 (step 2004). Note that, preferably, once selected as the proxy node 22, the proxy service 52 broadcasts an active proxy service notification over the LAN 26 periodically via a protocol such as, for example, Bonjour.

Next, the proxy service of the joining node then determines whether an active proxy service notification has been received before a predefined timeout period has expired (step 2006). The predefined timeout period may be any desired timeout period such as, for example, ten (10) seconds or ten (10) minutes. If an active proxy service notification is received before the timeout period has expired, then there is an existing proxy node 22 for the MCAS network 12. As such, the proxy service of the joining node remains inactive, and the joining node participates in the MCAS network 12 as one of the nodes 14-1 through 14-N (step 2008).

If an active proxy service notification is not received within the predefined timeout period, a proxy node negotiation process is performed (step 2010). The proxy node negotiation process may be any desired process for selecting one of the nodes in the MCAS network 12 as the proxy node. For example, during the proxy node negotiation process, each of the nodes in the MCAS network 12 may broadcast information about the node such as, for example, information regarding a connection between the node and the Internet 32 (e.g., bandwidth, maximum uplink data rate, maximum downlink data rate, or the like), information regarding the computing capabilities of the node (e.g., processor speed, memory size, or the like), or storage capabilities (e.g., size of secondary storage such as hard disk drive, Flash memory, or the like). Using this information and one or more predefined rules, one of the nodes is selected as the proxy node 22 for the MCAS network 12.

Next, the joining node determines whether the joining node has been selected as the proxy node 22 for the MCAS network 12 (step 2012). If not, the proxy service of the joining node remains inactive, and the joining node participates in the MCAS network 12 as one of the nodes 14-1 through 14-N (step 2008). However, if the joining node has been selected as the proxy node 22 for the MCAS network 12, then the proxy service is activated as the proxy service 52, and the joining node participates in the MCAS network 12 as the proxy node 22 (step 2014). The proxy service 52 of the proxy node 22 periodically determines whether it is time to broadcast an active proxy node notification (step 2016). As stated above, the proxy service 52 of the proxy node 22 preferably broadcasts an active proxy service notification over the LAN 26 at some predefined time interval such as, for example, ten (10) seconds or ten (10) minutes. If it is not time to broadcast an active proxy service notification, then the process returns to step 2012. If it is time to broadcast an active proxy service notification, the proxy service 52 of the proxy node 22 broadcasts an active proxy service notification over the LAN 26 using a protocol such as Bonjour (step 2018) and then the process returns to step 2012.

Figure 5:
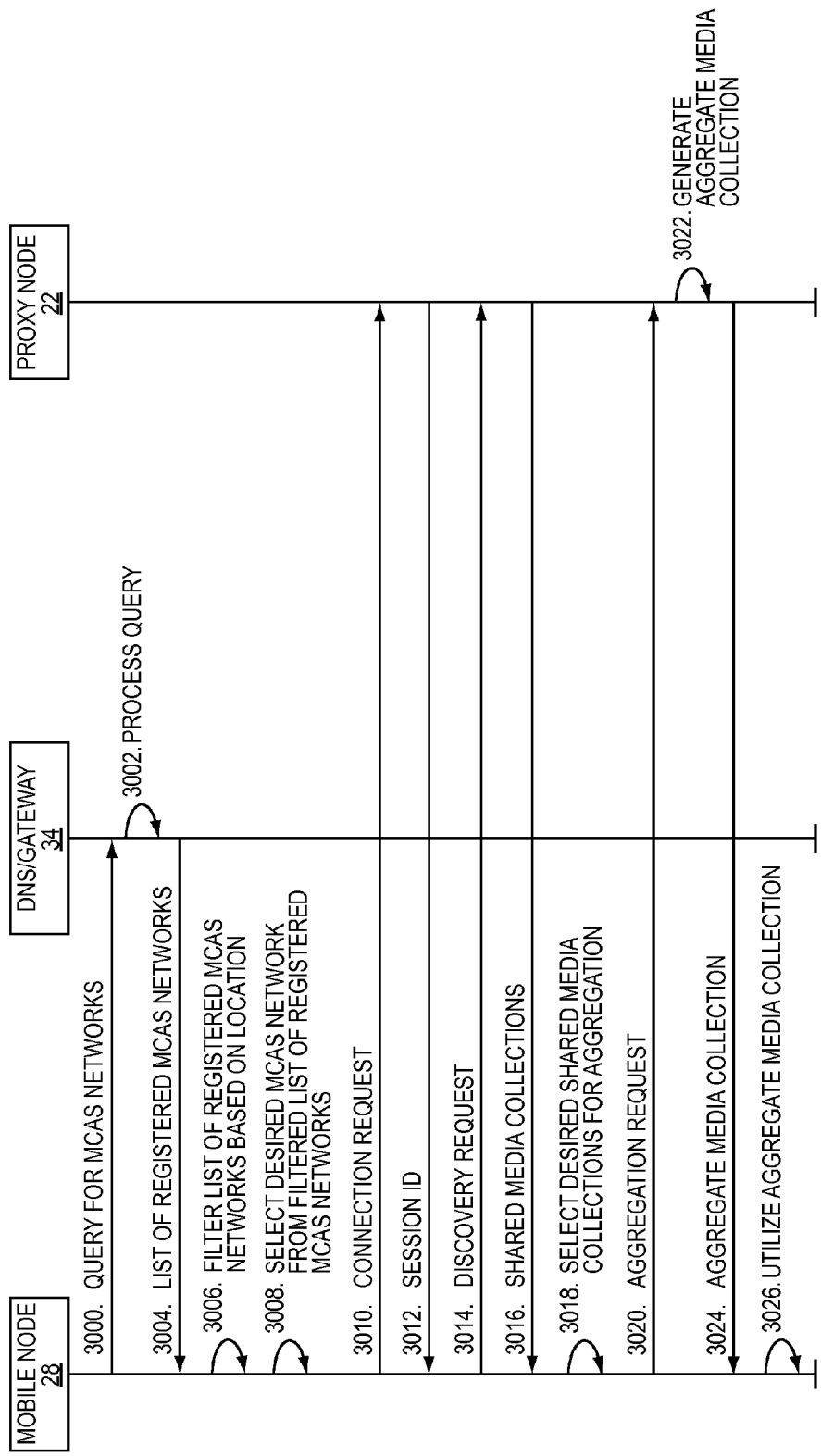
FIG. 5 illustrates the operation of the system of FIG. 1 to provide remote participation in the MCAS network according to one embodiment of the present disclosure.

FIG. 5 illustrates the operation of the system 10 to provide remote participation in the MCAS network 12 according to one embodiment of the present disclosure. While remote participation is described herein primarily with respect to the mobile node 28, one of ordinary skill in the art should readily appreciate that the system 10 likewise enables remote nodes to remotely participate in the MCAS network 12 regardless of whether the remote node is stationary or mobile.

First, the mobile MCAS client 64 of the mobile node 28 sends a query to the DNS/gateway 34 for registered MCAS networks (i.e., registered MCAS proxy services) (step 3000). The DNS-SD service 66 of the DNS/gateway 34 processes the query to identify registered MCAS networks having corresponding entries in the DNS-SD entry repository 68 (step 3002). The DNS-SD service 66 of the DNS/gateway 34 then returns a list of registered MCAS networks including the DNS-SD entries of the registered MCDS networks to the mobile MCAS client 64 of the mobile node 28 (step 3004).

Next, in this embodiment, the mobile MCAS client 64 of the mobile node 28 filters the list of registered MCAS networks based on location (step 3006). More specifically, a bounding region is first determined. The bounding region may be a geographic region of a predetermined shape and size centered at a current location of the mobile node 28 or a predefined geographic region in which the mobile node 28 is currently located (e.g., a city in which the mobile node 28 is located, a zip code in which the mobile node 28 is located, or the like). Alternatively, the bounding region may be a geographic region selected by the user 30. The list of registered MCAS networks is then filtered to remove MCAS networks located outside of the bounding region to provide a filtered list of MCAS networks. Note that, in an alternative embodiment, the bounding region is provided to or determined by the DNS-SD service 66 and used to filter the list of registered MCAS networks before providing the list of MCAS networks to the mobile node 28 in step 3004.

The mobile MCAS client 64 then selects a desired MCAS network from the filtered list of registered MCAS networks (step 3008). Preferably, user input selecting the desired MCAS network is received from the user 30. In this example, the desired MCAS network is the MCAS network 12. Using information in the DNS-SD entry for the MCAS network 12, the mobile MCAS client 64 of the mobile node 28 connects to the proxy node 22 of the MCAS network 12 and is returned as a session identifier (ID) (steps 3010 and 3012). For example, as discussed above, the DNS-SD entry preferably includes a domain name or URL of the proxy node 22 and a port number that is to be used to connect to the proxy node 22. Using this information, the mobile MCAS client 64 is enabled to connect to the proxy node 22.

At this point, authentication may be performed. Authentication may be performed by providing appropriate credentials for remote participation to the proxy node 22 such as, for example, a password, a predetermined key, or the like. Authentication may be different for active and passive participation. Alternatively, authentication may only be required for active participation in the MCAS network 12. Authentication for active participation preferably includes authentication that the mobile node 28 was previously in the MCAS network 12 using credentials obtained while the mobile node 28 was in the MCAS network 12. For example, the credentials for active participation may be a shared secret, an asymmetric key pair, or other cryptographic data generated by the proxy node 22 and/or the mobile node 28 when the mobile node 28 is in the MCAS network 12. The credentials for remote active participation may be requested by the mobile node 28 upon request by the user 30 or automatically in response to a triggering event such as, for example, joining the MCAS network 12. The credentials of the mobile node 28 for remote active participation in the MCAS network 12 may expire after a predefined amount of time, expire if the mobile node 28 is powered-down (i.e., turned off), or the like. Alternatively, the credentials of the mobile node 28 for remote active participation in the MCAS network 12 may never expire.

Next, the mobile MCAS client 64 sends a discovery request to the proxy node 22 (step 3014). In response, the proxy node 22 returns a list of shared media collections in the MCAS network 12 to the mobile node 28 (step 3016). The mobile MCAS client 64 then selects shared media collections desired for aggregation (step 3018). Preferably, user input is received from the user 30 selecting the shared media collections desired for aggregation. The number of shared media collections selected by the user 30 may vary depending on whether the user 30 desires to include a local media collection of the mobile node 28 in the aggregate media collection of the user 30. If the local media collection is not included, then the user 30 selects two or more of the shared media collections for aggregation. If the local media collection is included, then the user 30 selects one or more of the shared media collections. The mobile MCAS client 64 of the mobile node 28 then sends an aggregation request to the proxy node 22 (step 3020). The aggregation request identifies the shared media collections desired for aggregation. In response, the proxy service 52 of the proxy node 22 generates an aggregate media collection for the user 30 of the mobile node 28 (step 3022). The aggregate media collection for the user 30 of the mobile node 28 is preferably stored as one of the aggregate media collections 62 at the proxy node 22.

The proxy service 52 then returns the aggregate media collection to the mobile node 28 (step 3024). Preferably, the aggregate media collection is returned to the mobile node 28 as needed. For example, as the user 30 navigates the aggregate media collection at the mobile node 28, the mobile MCAS client 64 requests data from the aggregate media collection of the user 30 from the proxy node 22 as needed. Thus, in general, the aggregate media collection of the user 30 hosted by the proxy node 22 operates as a remote data store for the mobile MCAS client 64.

The mobile MCAS client 64 enables the user 30 to utilize the aggregate media collection of the user 30 (step 3026). In one embodiment, the mobile MCAS client 64 enables the user 30 to passively participate in the MCAS network 12 using the aggregate media collection. As used herein, passive participation is browsing the aggregate media collection, searching the aggregate media collection, marking media items in the aggregate media collection to be included in an on-the-fly playlist that can subsequently be used when the mobile node 28 joins the MCAS network 12 or another MCAS network, or the like. However, passive participation does not include playing media items in the aggregate media collection other than, optionally, those media items in the aggregate media collection that are included in a local media collection stored on the mobile node 28.

In another embodiment, the mobile MCAS client 64 enables the user 30 to passively and actively participate in the MCAS network 12 using the aggregate media collection in much the same manner as if the mobile node 28 were actually in the MCAS network 12. As used herein, active participation is playing media items in the aggregate media collection that are not included in a local media collection of the mobile node 28, if any. As discussed below, playback of media items in the aggregate media collection is preferably provided via streaming the media item from the MCAS network 12 to the mobile node 28.

Figure 6:
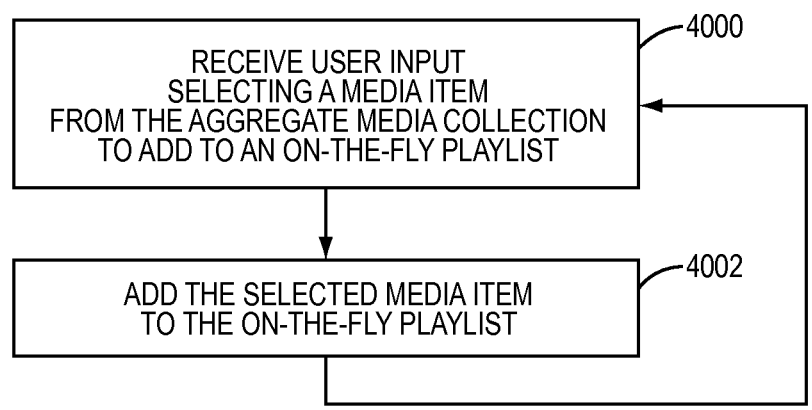
FIG. 6 illustrates a process for generating an on-the-fly playlist during passive participation in the MCAS network of FIG. 1 according to one embodiment of the present disclosure.

FIG. 6 illustrates a process for generating an on-the-fly playlist during remote passive participation in the MCAS network 12 according to one embodiment of the present disclosure. More specifically, FIG. 6 illustrates an on-the-fly playlist generation feature that may be provided by the mobile MCAS client 64 of the mobile node 28 during step 3026 of FIG. 5. First, while remotely participating in the MCAS network 12, the mobile MCAS client 64 receives user input from the user 30 selecting a media item in the aggregate media collection of the user 30 to be added to an on-the-fly playlist (step 4000). As used herein, an on-the-fly playlist is a playlist generated while remotely participating in an MCAS network.

Next, the mobile MCAS client 64 adds the selected media item to the on-the-fly playlist (step 4002). More specifically, the mobile MCAS client 64 adds an entry identifying the selected media item to the on-the-fly playlist. The data identifying the selected media item may be, for example, a GUID of the selected media item or media item type specific metadata identifying the selected media item. For example, for a song, the media item type specific metadata may be a combination of artist name, album name, title of the song, or the like.

The on-the-fly playlist is stored for subsequent use by the user 30 of the mobile node 28. In general, the on-the-fly playlist may be used in any desired manner. For example, if the user 30 subsequently enters the MCAS network 12, the on-the-fly playlist can be re-created using media items in the aggregate media collection of the user 30 while in the MCAS network 12 and then played by the user 30. When re-creating the on-the-fly playlist in the MCAS network 12, any media items in the on-the-fly playlist that are no longer shared in the MCAS network 12 may be ignored and/or the user 30 may be notified that those media items are not available. Similarly, if the user 30 subsequently enters another MCAS network, the on-the-fly playlist can be re-created using media items in the aggregate media collection of the user 30 while in the other MCAS network. When re-creating the on-the-fly playlist in the other MCAS network, any media items in the on-the-fly playlist that are not shared in the other MCAS network may be ignored and/or the user 30 may be notified that those media items are not available.

With respect to on-the-fly playlists, rather than selecting individual media items to include in an on-the-fly playlist, the mobile MCAS client 64 may enable the user 30 to persist an aggregated playlist included in the aggregate media collection of the user 30 as an on-the-fly playlist. This on-the-fly playlist may then be re-created when the user 30 joins a new MCAS network.

Figure 7:
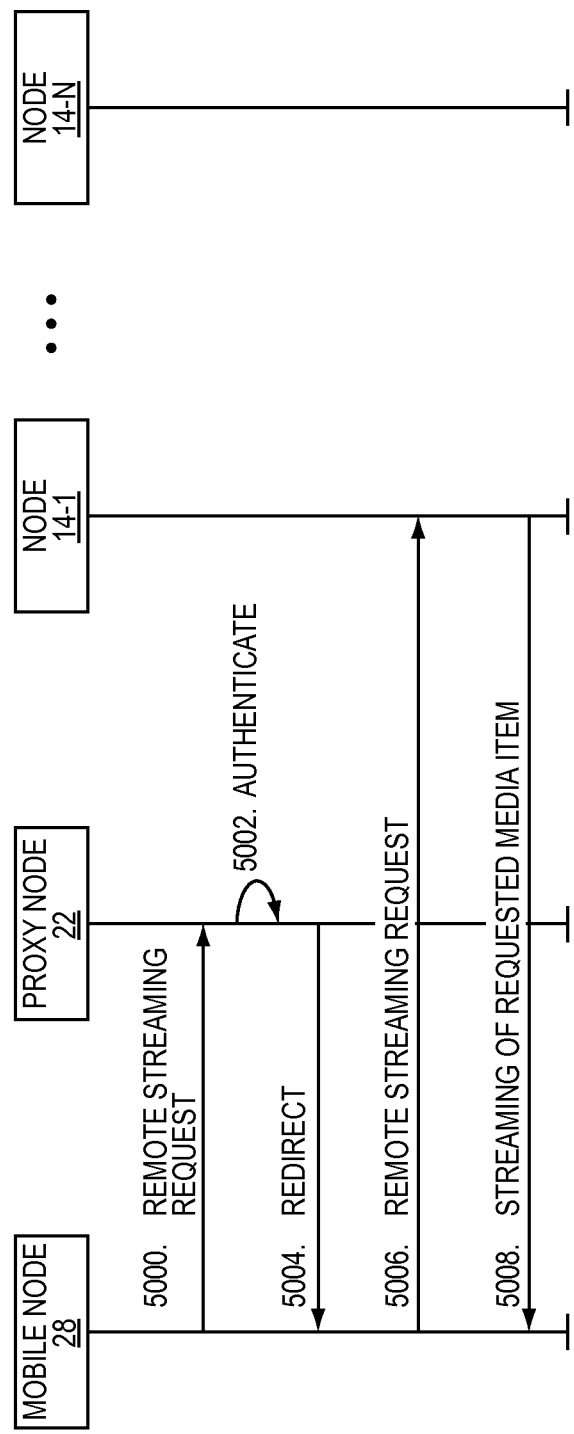
FIG. 7 illustrates the operation of the system of FIG. 1 to enable remote streaming of a media item from the MCAS network during remote participation in the MCAS network according to one embodiment of the present disclosure.

FIG. 7 illustrates the operation of the system 10 to provide remote streaming of a media item to the mobile node 28 from the MCAS network 12 while the mobile node 28 is actively participating in the MCAS network 12 remotely according to one embodiment of the present disclosure. More specifically, FIG. 7 illustrates a remote streaming feature that may be provided during step 3026 of FIG. 5. First, the mobile MCAS client 64 sends a remote streaming request for a media item to the proxy node 22 (step 5000). The requested media item may be a media item manually selected from the aggregate media collection by the user 30 or programmatically selected from the aggregate media collection in response to playback of a playlist.

In response to the request, the proxy service 52 of the proxy node 22 performs an authentication process to determine whether the mobile node 28 is permitted to actively participate in the MCAS network 12 remotely (step 5002). In one embodiment, authentication for active participation is performed when the mobile node 28 first connects to the proxy node 22 in step 3010 of FIG. 5, and step 5002 determines whether the mobile node 28 has been authenticated. In another embodiment, authentication for active participation is not performed until after the remote streaming request is received in step 5000. In either embodiment, authentication for active participation preferably includes authenticating that the mobile node 28 was previously in the MCAS network 12 using credentials obtained by the mobile node 28 while the mobile node 28 was located in the MCAS network 12, as discussed above. If the mobile node 28 is not authenticated for remote active participation, an error message is returned to the mobile node 28.

In this example, the mobile node 28 is authenticated for remote active participation. As such, the proxy service 52 of the proxy node 22 determines the source of the requested media item in the MCAS network 12 and redirects the mobile MCAS client 64 of the mobile node 28 to the source of the requested media item in the MCAS network 12 (step 5004). As discussed above, the aggregate media collection of the user 30 of the mobile node 28 includes a list of unique media items in the aggregate media collection of the user 30. Further, for each media item in the list of unique media items, the aggregate media collection of the user 30 includes a list of one or more sources of the media item in the MCAS network 12. Each source of a media item may be represented as a URL or similar resource locator of the media item in the shared media collection of one of the nodes 14-1 through 14-N or the shared media collection of the proxy node 22. As such, the proxy service 52 may redirect the mobile MCAS client 64 of the mobile node 28 to the requested media item by returning to the mobile node 28 the URL or similar resource locator of the requested media item at a corresponding one of the nodes 14-1 through 14-N or the proxy node 22. In this example, the source of the selected media item is the node 14-1.

Next, the mobile MCAS client 64 of the mobile node 28 sends a remote streaming request for the requested media item to the node 14-1 (step 5006). In response, the MCAS server 38-1 of the node 14-1 streams the requested media item to the mobile node 28 (step 5008). As the requested media item is streamed to the mobile node 28, the mobile MCAS client 64 or, alternatively, a media player function provides playback of the requested media item to the user 30.

In some implementations, the MCAS network 12 may be located behind a router implementing Network Address Translation (NAT). In these implementations, when redirecting the mobile node 28 to the node 14-1, the proxy service 52 of the proxy node 22 also creates a NAT Port Mapping Protocol (NAT-PMP) record in the router that allows an incoming remote streaming request to the MCAS server 38-1 of the node 14-1 behind the NAT. Note that the proxy service 52 may utilize NAT-PMP records to provide secure access to the MCAS network 12. More specifically, the proxy service 52 may use NAT-PMP records to implement securities policies by, for example, expunging NAT-PMP records from the router after a predefined amount of time (e.g., inactive NAT-PMP records are expunged after 24 hours).

Figure 8:
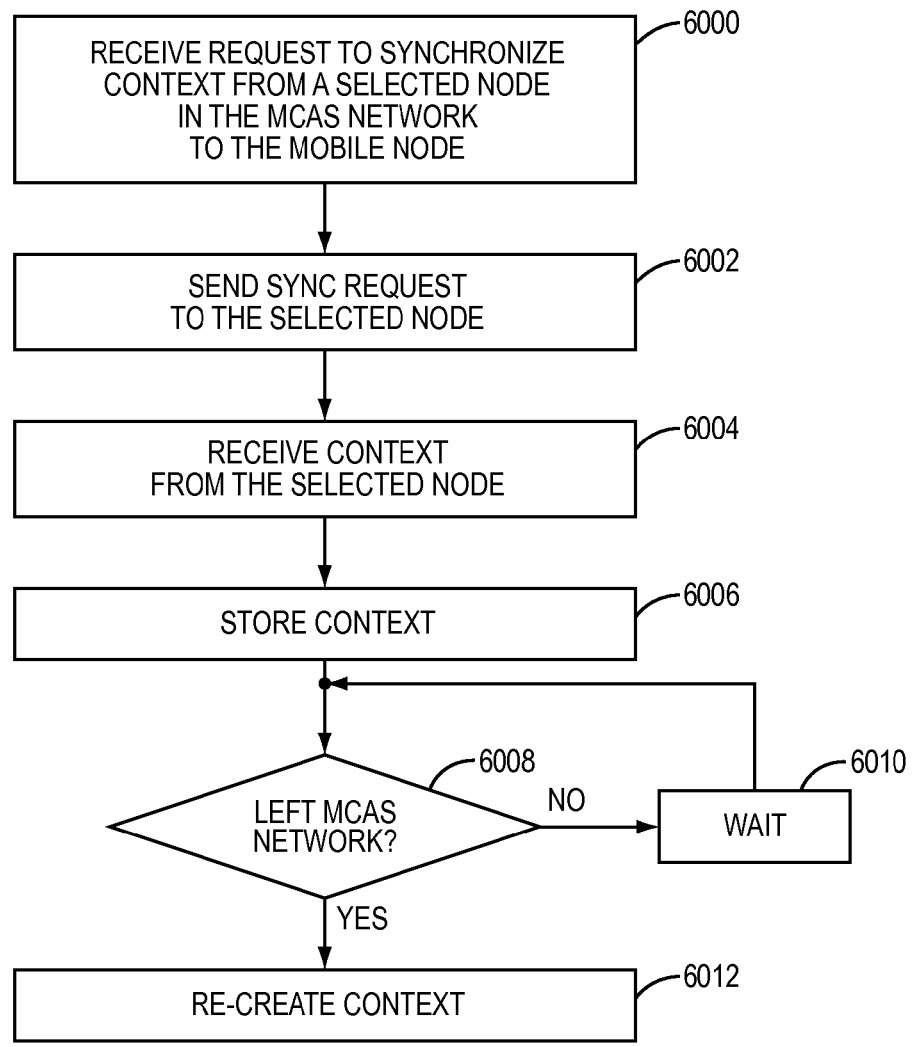
FIG. 8 illustrates a process for synchronizing a context of a select node in the MCAS network to a mobile node in the MCAS network and thereafter re-creating the context of the select node on the mobile node via remote participation with the MCAS network according to one embodiment of the present disclosure.

FIG. 8 illustrates a process for synchronizing a context of one of the nodes 14-1 through 14-N or the proxy node 22 in the MCAS network 12 to the mobile node 18 and then re-creating the context on the mobile node 18 when the mobile node 18 is outside of the LAN 26 via remote participation in the MCAS network 12 according to one embodiment of the present disclosure. In general, the process of FIG. 8 can be used by a user to seamlessly continue his or her experience with the MCAS network 12 after the user has left the LAN 26. First, the mobile MCAS client 46 of the mobile node 18 receives a request from the user 20 to synchronize a context of a selected node in the MCAS network 12 to the mobile node 18 (step 6000). The selected node may be one of the nodes 14-1 through 14-N or the proxy node 22. More specifically, in one embodiment, the mobile MCAS client 46 presents a list of nodes in the MCAS network 12 to the user 20 via a GUI. The user 20 may then select a desired node from the list and initiate the synchronization process.

The mobile MCAS client 46 of the mobile node 18 then sends a synchronization request to the selected node via the LAN 26 (step 6002). In response, the mobile MCAS client 46 of the mobile node 18 receives a context of the selected node from the selected node (step 6004). The context of the selected node preferably includes an aggregation context and a playback context of the selected node. The aggregation context is data identifying the media collections currently aggregated to form the aggregate media collection of the selected node. The playback context is data identifying a currently selected playlist in the aggregate media collection being played or otherwise selected by the selected node at the time of synchronization, data identifying a media item in the currently selected playlist being played or otherwise selected by the selected node at the time of synchronization, data identifying a time offset into the media item currently selected if the media item is currently being played, or any combination thereof. The data identifying the currently selected playlist may include, for example, a name of the playlist and metadata identifying the media items in the playlist. If the currently selected playlist is an aggregate playlist, the data identifying the currently selected playlist may also include data identifying the shared media collections from which the media items in the aggregate playlist are sourced. The data identifying the currently selected media item may include an index of the media item in the currently selected playlist or any other data that identifies the currently selected media item. If the currently selected media item is in an aggregate playlist, the data identifying the media item may also include data identifying a source of the media item in the MCAS network 12. Preferably, the context of the selected node does not include the aggregate media collection of the selected node. However, in an alternative embodiment, the context of the selected node may also include the aggregate media collection of the selected node. The mobile MCAS client 46 of the mobile node 18 stores the context of the selected node at the mobile node 18 (step 6006).

Next, the mobile MCAS client 46 determines whether the mobile node 18 has left the MCAS network 12 (i.e., has left the coverage area of the LAN 26) (step 6008). If not, the mobile MCAS client 46 waits a predefined amount of time (step 6010) and then returns to step 6008. Once the mobile node 18 has left the MCAS network 12, the mobile MCAS client 46 of the mobile node 18 re-creates the context of the selected node at the mobile node 18 (step 6012). In general, the mobile MCAS client 46 of the mobile node 18 remotely participates in the MCAS network 12 via the proxy node 22 according to the context of the selected node.

Figure 9:
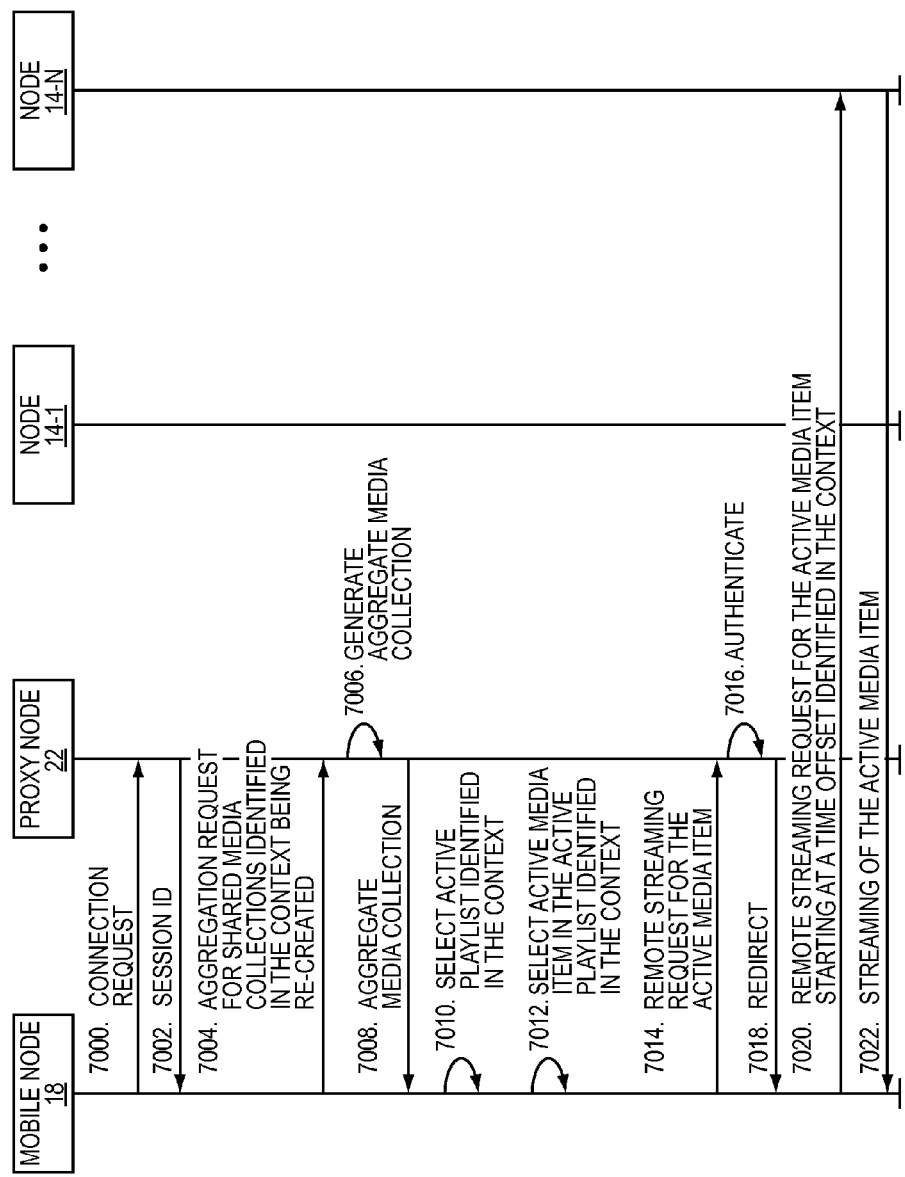
FIG. 9 illustrates a process for re-creating the context of the select node at the mobile node via remote participation in the MCAS network in more detail according to one embodiment of the present disclosure.

FIG. 9 illustrates step 6012 of FIG. 8 in more detail according to one embodiment of the present disclosure. First, the mobile MCAS client 46 of the mobile node 18 connects to the proxy node 22 of the MCAS network 12 (step 7000). In one embodiment, the mobile node 18 first queries the DNS/gateway 34 using a known name of the MCAS network 12 to obtain the DNS-SD entry for the MCAS network 12, which includes data needed to connect to the proxy node 22 (e.g., URL and port number). In another embodiment, the mobile node 18 may obtain the data needed to connect to the proxy node 22 from the proxy node 22 while in the MCAS network 12 and store the data for subsequent use.

Next, in this embodiment, the proxy service 52 establishes a session ID for the mobile node 18 and returns the session ID to the mobile node 18 (step 7002). The session ID is thereafter used for all communication between the mobile node 18 and the proxy node 22 regarding remote participation in the MCAS network 12. The mobile MCAS client 46 of the mobile node 18 then sends an aggregation request to the proxy node 22 for the shared media collections identified in the context being re-created (step 7004). In response, the proxy service 52 of the proxy node 22 aggregates the shared media collections identified in the aggregation request to generate an aggregate media collection for the user 20 of the mobile node 18 (step 7006). The aggregate media collection for the user 20 of the mobile node 18 is preferably stored as one of the aggregate media collections 62 at the proxy node 22.

The proxy service 52 then returns the aggregate media collection to the mobile node 18 via the Internet 32 (step 7008). Preferably, the aggregate media collection is returned to the mobile node 18 as needed, as discussed above. Next, in order to re-create the context previously synchronized to the mobile node 18, the mobile MCAS client 46 of the mobile node 18 selects the active playlist identified in the context being re-created in the aggregate media collection (step 7010). More specifically, the mobile MCAS client 46 presents the aggregate media collection, or a portion thereof, to the user 20 of the mobile node 18 via a GUI. Within the GUI, the active playlist identified by the context being re-created is selected. In addition, the mobile MCAS client 46 of the mobile node 18 selects the active media item identified in the context being re-crated in the active playlist (step 7012). More specifically, the active media item is selected within the GUI used to present the aggregate media collection to the user 20 at the mobile node 18.

In addition, the mobile MCAS client 46 of the mobile node 18 sends a remote streaming request for the active media item identified in the context being re-created to the proxy node 22 (step 7014). In response to the request, the proxy service 52 of the proxy node 22 performs an authentication process to determine whether the mobile node 18 is permitted to actively participate in the MCAS network 12 remotely (step 7016). In one embodiment, authentication for active participation is performed when the mobile node 18 first connects to the proxy node 22 in step 7000, and step 7016 determines whether the mobile node 18 has been authenticated. In another embodiment, authentication for active participation is not performed until after the remote streaming request is received in step 7004. In either embodiment, authentication for remote active participation preferably includes authenticating that the mobile node 18 was previously in the MCAS network 12 using credentials obtained by the mobile node 18 while the mobile node 18 was located in the MCAS network 12, as described above. If the mobile node 18 is not authenticated for remote active participation, an error message is returned to the mobile node 18.

In this example, the mobile node 18 is authenticated for remote active participation. As such, the proxy service 52 of the proxy node 22 determines the source of the active media item in the MCAS network 12 and redirects the mobile MCAS client 46 of the mobile node 18 to the source of the active media item in the MCAS network 12 (step 7018). As discussed above, the aggregate media collection of the user 20 of the mobile node 18 includes a list of unique media items in the aggregate media collection of the user 20. Further, for each media item in the list of unique media items, the aggregate media collection of the user 20 includes a list of one or more sources of the media item in the MCAS network 12. Each source of a media item may be represented as a URL or similar resource locator of the media item in the shared media collection of one of the nodes 14-1 through 14-N or the shared media collection of the proxy node 22. As such, the proxy service 52 may redirect the mobile MCAS client 46 of the mobile node 18 to the active media item by returning to the mobile node 18 the URL or similar resource locator of the active media item at a corresponding one of the nodes 14-1 through 14-N or the proxy node 22. In this example, the source of the active media item is the node 14-N.

Next, the mobile MCAS client 46 of the mobile node 18 sends a remote streaming request for the active media item to the node 14-N starting at a time offset identified in the context to be re-created (step 7020). In response, the MCAS server 38-N of the node 14-N streams the active media item to the mobile node 18 beginning at the requested time-offset (step 7022). Alternatively, the mobile MCAS client 46 may send a remote streaming request for the active media item to the node 14-N, receive the streaming active media item from the node 14-N, and fast-forward to the time-offset identified by the context being re-created. As the requested media item is streamed to the mobile node 18, the mobile MCAS client 46 or, alternatively, a media player function provides playback of the requested media item to the user 20. It should be noted that if the active media item is stored in the local media collection 48 of the mobile node 18, playback of the active media item is provided from the local media collection 48 of the mobile node 18 and, as such, steps 7014 through 7022 are not needed.

Figure 10:
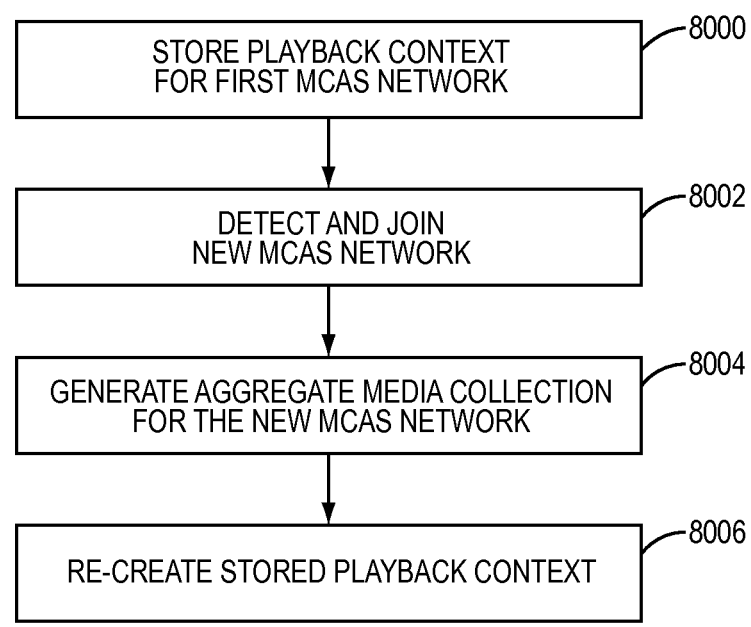
FIG. 10 illustrates a process for storing a playback context for a first MCAS network and re-creating the playback context upon joining a new MCAS network according to one embodiment of the present disclosure.

FIG. 10 illustrates a process for re-creating a playback context upon entering a new MCAS network according to one embodiment of the present disclosure. This process is particularly applicable to mobile nodes, such as the mobile nodes 18 and 28. However, this process may also be used to re-create a playback context when one of the nodes 14-1 through 14-N or the proxy node 22 moves from the MCAS network 12 to another MCAS network.

Using the mobile node 18 as an example, first, the mobile MCAS client 46 stores a playback context for a first MCAS network, which for this example is the MCAS network 12 (step 8000). In one embodiment, the playback context is the playback context of the mobile node 18. The playback context of the mobile node 18 includes data defining an active playlist currently being played or otherwise selected at the mobile node 18 at the time the playback context is stored (e.g., playlist name and metadata identifying media items in the playlist), data identifying an active media item in the active playlist that is currently playing or otherwise selected at the time the playback context is stored, a time offset defining a point in playback of the active media item at the time the playback context is stored, or any combination thereof. Alternatively, the playback context may be a playback context of one of the nodes 14-1 through 14-N or the proxy node 22 that has been synchronized to the mobile node 18 in a manner similar to that described above. In this case, the playback context of the other node includes data defining an active playlist currently being played or otherwise selected at the other node at the time the playback context is obtained and stored (e.g., playlist name and metadata identifying media items in the playlist), data identifying an active media item in the active playlist that is currently playing or otherwise selected at the other node at the time the playback context is obtained and stored, a time offset defining a point in playback of the active media item at the other node at the time the playback context is obtained and stored, or any combination thereof.

Next, after leaving the LAN 26 and thus the MCAS network 12, the mobile node 18 detects and joins a new MCAS network (step 8002). The mobile MCAS client 46 then generates the aggregate media collection 50 of the user 20 for the new MCAS network (step 8004). More specifically, in one embodiment, the mobile MCAS client 46 first discovers shared media collections in the new MCAS network. The user 20 then provides user input to the mobile MCAS client 46 selecting two or more media collections for aggregation. The media collections selected for aggregation include two or more media collections selected from a group of media collections including the local media collection 48 of the mobile node 18 and the shared media collections in the new MCAS network. The mobile MCAS client 46 then obtains shared media collection information for any of the shared media collections selected for aggregation and aggregates the shared media collection information and, if selected, the local media collection 48 of the mobile node 18 to provide the aggregate media collection 50 of the user 20 for the new MCAS network. It should be noted that in an alternative embodiment, a proxy node of the new MCAS network may generate and maintain the aggregate media collection 50 of the mobile node 18 and provide the aggregate media collection 50 to the mobile node 18 as needed.

The mobile MCAS client 46 of the mobile node 18 then re-creates the stored playback context (step 8006). More specifically, using the aggregate media collection 50 of the user 20 for the new MCAS network, the mobile MCAS client 46 re-creates the stored playback context. In the preferred embodiment, the stored playback context is re-created by re-creating the active playlist defined by the stored playback context using media items in the aggregate media collection of the user 20 for the new MCAS network. Any media items in the active playlist that are not included in the aggregate media collection 50 of the user 20 for the new MCAS network may be ignored. In addition or alternatively, the user 20 may be notified of any media items in the active playlist that are not available in the aggregate media collection 50 of the user 20 for the new MCAS network.

In addition, the mobile MCAS client 46 selects the active media item in the active playlist that is identified in the stored playback context and begins playback of the active media item at the time offset identified in the stored playback context. Assuming that the active media item is shared by another node in the new MCAS network, the mobile MCAS client 46 sends a streaming request for the active media item to that node in the new MCAS network. The node then begins streaming the active media item to the mobile node 18. Regarding the time offset, streaming of the active media item preferably begins at the time offset identified in the stored playback context. Alternatively, streaming of the active media item may begin at the start of the active media item, where the mobile MCAS client 46 then fast-forwards to the time offset identified in the stored playback context.

While the process of FIG. 10 has been described with respect to the mobile node 18 moving from the MCAS network 12 to a new MCAS network, the process of FIG. 10 may additionally or alternatively be used in combination with the process of FIGS. 8 and 9. More specifically, as discussed above with respect to FIGS. 8 and 9, the context of one of the nodes 14-1 through 14-N or the proxy node 22 may be synchronized to and stored by the mobile node 18. Then, after the mobile node 18 leaves the LAN 26 and thus the MCAS network 12, the mobile node 18 may then re-create the context synchronized to the mobile node 18 via remote participation with the MCAS network 12 via the proxy node 22. In this manner, a user may continue his or her experience (e.g., playback experience) with the MCAS network 12 after leaving the LAN 26. Sometime thereafter, the mobile node 18 may detect and join a new MCAS network. In this case, the process of FIG. 10 may be used to store the playback context of the mobile node 18 before entering the new MCAS network and then re-create the stored playback context in the new MCAS network.

Figure 11:
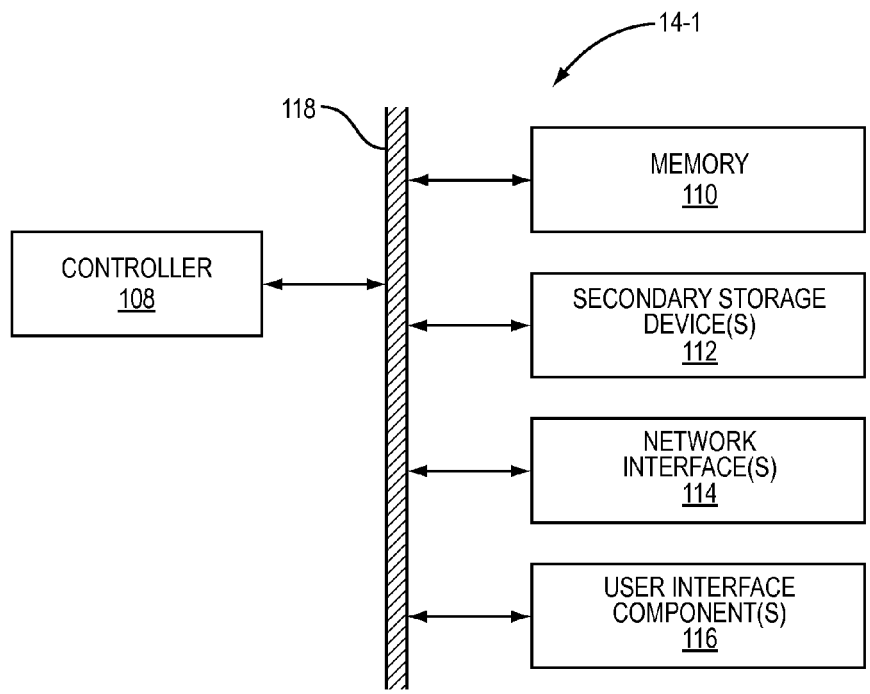
FIG. 11 is a block diagram of one of the nodes in the MCAS network of FIG. 1 according to one embodiment of the present disclosure.

FIG. 11 is a block diagram of the node 14-1 according to one embodiment of the present disclosure. This discussion is equally applicable to the other nodes 14-2 through 14-N. As illustrated, the node 14-1 includes a controller 108 connected to memory 110, one or more secondary storage devices 112, one or more network interfaces 114, and one or more user interface components 116 by a bus 118 or similar mechanism.

The controller 108 is a microprocessor, digital Application Specific Integrated Circuit (ASIC), Field Programmable Gate Array (FPGA), or the like. In this embodiment, the controller 108 is a microprocessor, and the proxy service 36-1, the MCAS server 38-1, and the MCAS client 40-1 are implemented in software and stored in the memory 110 for execution by the controller 108. The one or more secondary storage devices 112 are digital storage devices such as, for example, one or more hard disk drives. The local media collection 42-1 and the aggregate media collection 44-1 of the user 16-1 of the node 14-1 are stored in the one or more secondary storage devices 112. Alternatively, all or a portion of the local media collection 42-1 and/or the aggregate media collection 44-1 may be stored in the memory 110. The one or more network interfaces 114 include either a wired or wireless interface to the LAN 26 such as, for example, an Ethernet interface, local wireless network interface such as a wireless interface operating according to one of the suite of IEEE 802.11 standards, or the like. In addition, the node 14-1 is enabled to connect to the Internet 32 via the LAN 26 (i.e., through a router associated with the LAN 26) or via a separate wired or wireless network interface. The one or more user interface components 116 include, for example, a touchscreen, a display, one or more user input components (e.g., a keypad), a speaker, or the like, or any combination thereof.

Figure 12:
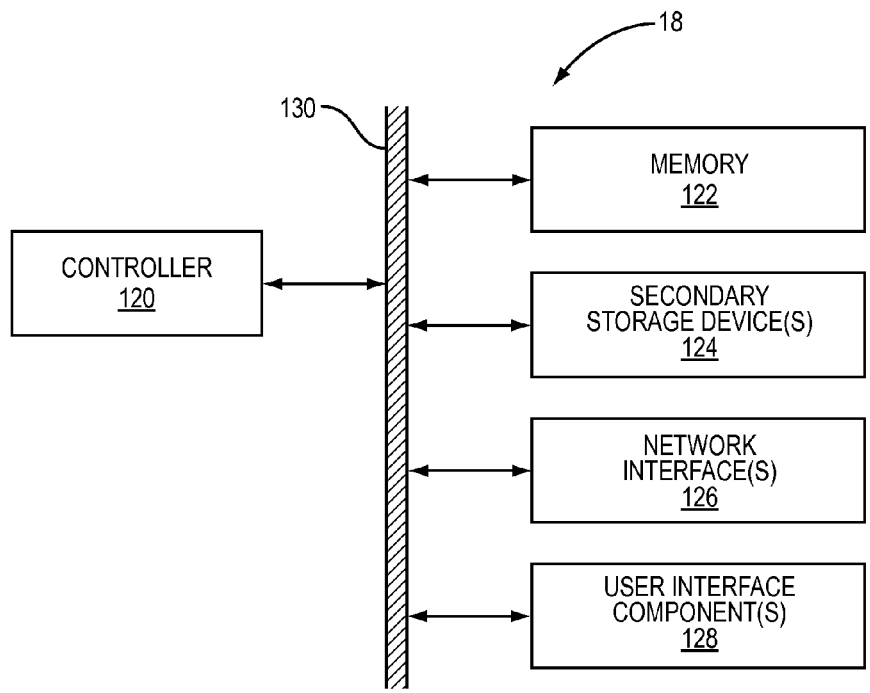
FIG. 12 is a block diagram of one of the mobile nodes of FIG. 1 according to one embodiment of the present disclosure.

FIG. 12 is a block diagram of the mobile node 18 according to one embodiment of the present disclosure. This discussion is equally applicable to the mobile node 28. As illustrated, the mobile node 18 includes a controller 120 connected to memory 122, one or more secondary storage devices 124, one or more network interfaces 126, and one or more user interface components 128 by a bus 130 or similar mechanism. The controller 120 is a microprocessor, digital ASIC, FPGA, or the like. In this embodiment, the controller 120 is a microprocessor, and the mobile MCAS client 46 is implemented in software and stored in the memory 122 for execution by the controller 120. The one or more secondary storage devices 124 are digital storage devices such as, for example, one or more hard disk drives. The local media collection 48 and the aggregate media collection 50 (or data from the aggregate media collection 50) of the user 20 of the mobile node 18 may be stored in the one or more secondary storage devices 124. Alternatively, all or a portion of the local media collection 48 and/or the aggregate media collection 50 may be stored in the memory 122. The one or more network interfaces 126 include either a wired or wireless interface capable of connecting the mobile node 18 to the LAN 26 such as, for example, an Ethernet interface, local wireless network interface such as a wireless interface operating according to one of the suite of IEEE 802.11 standards, or the like. In addition, the mobile node 18 may enabled to connect to the Internet 32 via the LAN 26 (i.e., through a router associated with the LAN 26) or via a separate wired or wireless network interface. Still further, the mobile node 18 also includes a wireless cellular network interface to the Internet 32 such as, for example, a 3G or 4G wireless network interface (e.g., a Global System for Mobile Communications (GSM) 3G wireless interface, a Long Term Evolution (LTE) or WiMAX 4G wireless interface, or the like). The one or more user interface components 128 include, for example, a touchscreen, a display, one or more user input components (e.g., a keypad), a speaker, or the like, or any combination thereof.

Figure 13:
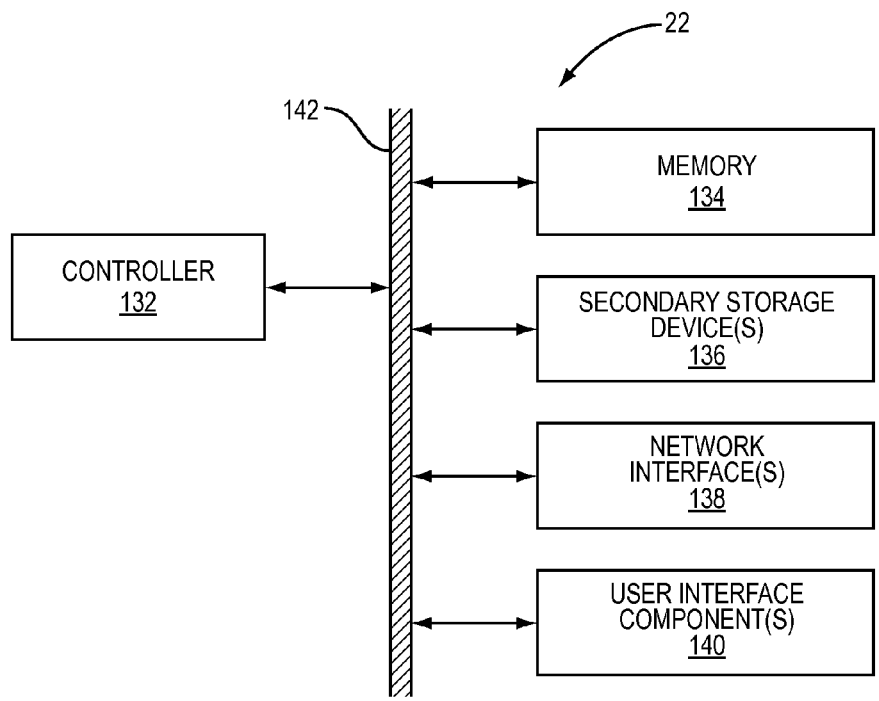
FIG. 13 is a block diagram of the proxy node of FIG. 1 according to one embodiment of the present disclosure.

FIG. 13 is a block diagram of the proxy node 22 according to one embodiment of the present disclosure. As illustrated, the proxy node 22 includes a controller 132 connected to memory 134, one or more secondary storage devices 136, one or more network interfaces 138, and one or more user interface components 140 by a bus 142 or similar mechanism. The controller 132 is a microprocessor, digital ASIC, FPGA, or the like. In this embodiment, the controller 132 is a microprocessor, and the proxy service 52, the MCAS server 54, and the MCAS client 56 are implemented in software and stored in the memory 134 for execution by the controller 132. The one or more secondary storage devices 136 are digital storage devices such as, for example, one or more hard disk drives. The local media collection 58, the aggregate media collection 60 of the user 24 of the proxy node 22, and the aggregate media collection(s) 62 maintained for remote users are stored in the one or more secondary storage devices 136. Alternatively, all or a portion of the local media collection 58 and/or the aggregate media collections 60 and 62 may be stored in the memory 134. The one or more network interfaces 138 include either a wired or wireless interface to the LAN 26 such as, for example, an Ethernet interface, local wireless network interface such as a wireless interface operating according to one of the suite of IEEE 802.11 standards, or the like. In addition, the proxy node 22 is enabled to connect to the Internet 32 via the LAN 26 (i.e., through a router associated with the LAN 26) or via a separate wired or wireless network interface. The one or more user interface components 140 include, for example, a touchscreen, a display, one or more user input components (e.g., a keypad), a speaker, or the like, or any combination thereof.

Figure 14:
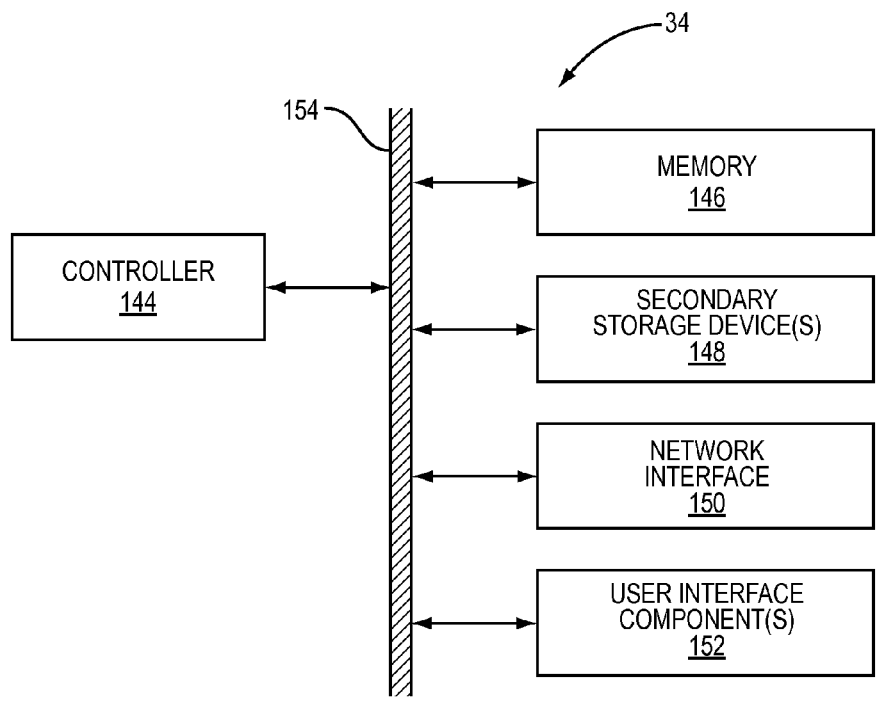
FIG. 14 is a block diagram of the Domain Name Server (DNS)/gateway of FIG. 1 according to one embodiment of the present disclosure.

FIG. 14 is a block diagram of the DNS/gateway 34 according to one embodiment of the present disclosure. As illustrated, the DNS/gateway 34 includes a controller 144 connected to memory 146, one or more secondary storage devices 148, a network interface 150, and one or more user interface components 152 by a bus 154 or similar mechanism. The controller 144 is a microprocessor, digital ASIC, FPGA, or the like. In this embodiment, the controller 144 is a microprocessor, and the DNS-SD service 66 is implemented in software and stored in the memory 146 for execution by the controller 144. The one or more secondary storage devices 148 are digital storage devices such as, for example, one or more hard disk drives. The DNS-SD entry repository 68 may be implemented in the one or more secondary storage devices 148. Alternatively, all or a portion of the DNS-SD entry repository 68 may be implemented in the memory 146. The network interface 150 is either a wired or wireless interface to the Internet 32 such as, for example, an Ethernet interface, local wireless network interface such as a wireless interface operating according to one of the suite of IEEE 802.11 standards, or the like. The one or more user interface components 152 include, for example, a touchscreen, a display, one or more user input components (e.g., a keypad), a speaker, or the like, or any combination thereof.

Those skilled in the art will recognize improvements and modifications to the preferred embodiments of the present invention. All such improvements and modifications are considered within the scope of the concepts disclosed herein and the claims that follow.

What is claimed is:

1. A method of operation of a proxy node for a Local Area Network (LAN) based ad-hoc Media Collection Aggregation System (MCAS) network formed by a plurality of nodes sharing corresponding shared media collections, comprising:
 at the proxy node for the LAN based MCAS:
  registering the MCAS network formed by the plurality of nodes sharing corresponding shared media collections with a centralized server providing Wide Area Network (WAN) based service discovery;

aggregating two or more of the shared media collections of the plurality of nodes forming the MCAS network to provide an aggregate media collection of a user of the remote node; and providing the aggregate media collection to the remote node such that the user of the remote node is enabled perform at least one action from a group consisting of: browse the aggregate media collection and search the aggregate media collection, wherein providing the aggregate media collection to the remote node comprises:

storing the aggregate media collection of the user of the remote node at the proxy node; and
providing data from the aggregate media collection of the user to the remote node as needed, wherein the MCAS network is discovered by the remote node via the centralized server providing the WAN based service discovery, and wherein at least one of the preceding actions is performed on at least one electronic hardware component.

2. The method of claim 1 wherein aggregating the two or more of the shared media collections of the plurality of nodes forming the MCAS network to provide the aggregate media collection of the user of the remote node comprises:

receiving a discovery request from the remote node;
returning information identifying the shared media collections of the plurality of nodes forming the MCAS network to the remote node in response to the discovery request;
receiving an aggregation request from the remote node for the two or more of the shared media collections; and
aggregating the two or more of the shared media collections identified in the aggregation request to provide the aggregate media collection for the user of the remote node.

3. The method of claim 1 wherein the aggregate media collection of the user of the remote node includes data identifying a plurality of unique media items in the two or more of the shared media collections, and the aggregate media collection does not include media items in the two or more of the shared media collections.

4. The method of claim 1 wherein enabling the remote node to passively participate in the MCAS network does not include enabling the remote node to provide streaming playback of media items from the MCAS network.

5. A method of operation of a proxy node for a Local Area Network (LAN) based ad-hoc Media Collection Aggregation System (MCAS) network formed by a plurality of nodes sharing corresponding shared media collections, comprising:

at the proxy node for the LAN based MCAS:
registering the MCAS network formed by the plurality of nodes sharing corresponding shared media collections with a centralized server providing Wide Area Network (WAN) based service discovery; and
enabling a remote node to actively participate in the MCAS network, wherein the MCAS network is discovered by the remote node via the centralized server providing the WAN based service discovery, wherein enabling the remote node to actively participate in the MCAS network comprises:
aggregating two or more of the shared media collections of the plurality of nodes forming the MCAS network to provide an aggregate media collection of a user of the remote node;
providing the aggregate media collection to the remote node by:
storing the aggregate media collection of the user of the remote node at the proxy node; and
providing data from the aggregate media collection of the user to the remote node as needed; and
enabling the remote node to provide streaming playback of media items in the aggregate media collection from the MCAS network wherein at least one of the preceding actions is performed on at least one electronic hardware component.

6. The method of claim 5 wherein aggregating the two or more of the shared media collections of the plurality of nodes forming the MCAS network to provide the aggregate media collection of the user of the remote node comprises:

receiving a discovery request from the remote node;
returning information identifying the shared media collections of the plurality of nodes forming the MCAS network to the remote node in response to the discovery request;
receiving an aggregation request from the remote node for the two or more of the shared media collections; and
aggregating the two or more of the shared media collections identified in the aggregation request to provide the aggregate media collection for the user of the remote node.

7. The method of claim 5 wherein the aggregate media collection of the user of the remote node includes data identifying a plurality of unique media items in the two or more of the shared media collections, and the aggregate media collection does not include media items in the two or more of the shared media collections.

8. The method of claim 5 wherein enabling the remote node to provide streaming playback of the media items in the aggregate media collection from the MCAS network comprises:

receiving, from the remote node, a request for a selected media item in the aggregate media collection of the user of the remote node;
identifying one of the plurality of nodes that is a source of the selected media item in the MCAS network; and
redirecting the remote node to the one of the plurality of nodes that is the source of the media item in the MCAS network such that the remote node is enabled to request streaming of the selected media item from the one of the plurality of nodes that is the source of the media item in the MCAS network.

9. The method of claim 5 wherein enabling the remote node to remotely participate in the MCAS network comprises:

authenticating the remote node for remote active participation in the MCAS network based on credentials provided by the remote node; and
enabling the remote node to actively participate in the MCAS network only if the remote node is authenticated.

10. The method of claim 9 wherein the credentials used to authenticate the remote node for remote active participation in the MCAS network are credentials obtained by the remote node when the remote node was previously a node in the MCAS network.

11. The method of claim 10 wherein the credentials used to authenticate the remote node for remote active participation in the MCAS network expire upon occurrence of an event selected from a group consisting of: expiration of a predefined amount of time and power-down of the remote node.

12. The method of claim 5 wherein the WAN based service discovery is implemented using WAN Bonjour.

13. A proxy node for a Local Area Network (LAN) based ad-hoc Media Collection Aggregation System (MCAS) network formed by a plurality of nodes sharing corresponding shared media collections, comprising components including:
- at least one network interface;
- at least one processor in communication with the network interface, and
- memory containing software executable by the at least one processor whereby the proxy node is operative to:
  - register the MCAS network formed by the plurality of nodes sharing corresponding shared media collections with a centralized server providing Wide Area Network (WAN) based service discovery; and
  - aggregate two or more of the shared media collections of the plurality of nodes forming the MCAS network to provide an aggregate media collection of a user of the remote node; and
  - provide the aggregate media collection to the remote node such that the user of the remote node is enabled perform at least one action from a group consisting of: browse the aggregate media collection and search the aggregate media collection, wherein providing the aggregate media collection to the remote node comprises:
    - storing the aggregate media collection of the user of the remote node at the proxy node; and
    - providing data from the aggregate media collection of the user to the remote node as needed,
  - wherein the MCAS network is discovered by the remote node via the centralized server providing the WAN based service discovery.

14. A method of operation of a mobile node comprising:
at the mobile node:
- discovering a Local Area Network (LAN) based ad-hoc Media Collection Aggregation System (MCAS) network formed by a plurality of nodes sharing corresponding shared media collections; and
- passively participating in the MCAS network via a proxy node of the MCAS network, wherein passively participating in the MCAS network via the proxy node comprises:
  - obtaining information identifying the shared media collections of the plurality of nodes in the MCAS network from the proxy node;
  - sending an aggregation request for two or more of the shared media collections to the proxy node;
  - obtaining an aggregate media collection of a user of the mobile node from the proxy node, the aggregate media collection being an aggregate of the two or more of the shared media collections; and
  - enabling the user of the mobile node to perform at least one action from a group consisting of: browsing the aggregate media collection and searching the aggregate media collection,
- wherein at least one of the preceding actions is performed on at least one electronic hardware component.

15. The method of claim 14 wherein discovering the MCAS network comprises:
- querying a centralized server providing Wide Area Network (WAN) based service discovery to obtain a list of MCAS networks; and
- selecting the MCAS network from the list of MCAS networks.

16. The method of claim 14 wherein discovering the MCAS network comprises:
- querying a centralized server providing Wide Area Network (WAN) based service discovery to obtain a list of MCAS networks;
- filtering the list of MCAS networks based on geographic location to provide a filtered list of MCAS networks; and
- selecting the MCAS network from the list of MCAS networks.

17. The method of claim 14 wherein:
- discovering the MCAS network comprises obtaining a Domain Name Server-Service Discovery (DNS-SD) entry for the MCAS network from a centralized DNS-SD service providing Wide Area Network (WAN) based service discovery; and
- remotely participating in the MCAS network via the proxy node of the MCAS network comprises connecting to the proxy node of the MCAS network using a domain name included in the DNS-SD entry for the MCAS network.

18. The method of claim 14 wherein the aggregate media collection of the user of the mobile node is stored by the proxy node, and obtaining the aggregate media collection of the user of the mobile node from the proxy node comprises obtaining data from the aggregate media collection from the proxy node as needed.

19. The method of claim 14 wherein the aggregate media collection of the user of the mobile node includes data identifying a plurality of unique media items in the two or more of the shared media collections, and the aggregate media collection does not include media items in the two or more of the shared media collections.

20. The method of claim 14 wherein passively participating in the MCAS network does not include providing streaming playback of media items from the MCAS network.

21. The method of claim 14 wherein remotely participating in the MCAS network via the proxy node of the MCAS network comprises enabling a user of the mobile node to create an on-the-fly playlist including one or more media items from the shared media collections of the plurality of nodes.

22. The method of claim 21 further comprising:
- joining an MCAS network;
- aggregating two or more of the shared media collections in the MCAS network to provide an aggregate media collection of the user of the mobile node for the MCAS network; and
- re-creating the on-the-fly playlist from media items in the aggregate media collection of the user of the mobile node for the MCAS network.

23. The method of claim 14 further comprising:
- synchronizing a context of one of the plurality of nodes forming the MCAS network to the mobile node while the mobile node is in the MCAS network;
- wherein passively participating in the MCAS network via the proxy node of the MCAS network comprises re-creating the context of the one of the plurality of nodes on the mobile node after the mobile node has left the MCAS network by remotely participating in the MCAS network via the proxy node of the MCAS network.

24. The method of claim 23 wherein the context of the one of the plurality of nodes comprises a playback context of the one of the plurality of nodes at a time when the context is synchronized to the mobile node.

25. The method of claim 24 wherein the playback context includes information identifying an active playlist, an active media item in the active playlist, and a time offset in the active media item.

26. The method of claim 23 wherein the context of the one of the plurality of nodes comprises an aggregation context of the one of the plurality of nodes at a time when the context is synchronized to the mobile node.

27. The method of claim 26 wherein the aggregation context includes information identifying one or more shared media collections used to form an aggregate media collection of a user of the one of the plurality of nodes at a time when the context is synchronized to the mobile node.

28. The method of claim 14 further comprising:
storing a playback context of the mobile node;
joining a new MCAS network;
obtaining an aggregate media collection of a user of the mobile node in the new MCAS network; and
re-creating the playback context using the aggregate media collection of the user of the mobile node in the new MCAS network.

29. A method of operation of a mobile node comprising:
at the mobile node:
discovering a Local Area Network (LAN) based ad-hoc Media Collection Aggregation System (MCAS) network formed by a plurality of nodes sharing corresponding shared media collections; and
actively participating in the MCAS network via a proxy node of the MCAS network, wherein actively participating in the MCAS network via the proxy node comprises:
obtaining information identifying the shared media collections of the plurality of nodes in the MCAS network from the proxy node;
sending an aggregation request for two or more of the shared media collections to the proxy node;
obtaining an aggregate media collection of a user of the mobile node from the proxy node, the aggregate media collection being an aggregate of the two or more of the shared media collections; and
providing streaming playback of media items in the aggregate media collection from the MCAS network,
wherein at least one of the preceding actions is performed on at least one electronic hardware component.

30. The method of claim 29 wherein the aggregate media collection of the user of the mobile node is stored by the proxy node, and obtaining the aggregate media collection of the user of the mobile node from the proxy node comprises obtaining data from the aggregate media collection from the proxy node as needed.

31. The method of claim 29 wherein the aggregate media collection of the user of the mobile node includes data identifying a plurality of unique media items in the two or more of the shared media collections, and the aggregate media collection does not include media items in the two or more of the shared media collections.

32. The method of claim 29 wherein providing streaming playback of the media items in the aggregate media collection from the MCAS network comprises:
sending a request for a selected media item in the aggregate media collection of the user of the remote node to the proxy node of the MCAS network;
receiving a response from the proxy node that redirects the mobile node to one of the plurality of nodes that is a source of the selected media item in the MCAS network;
sending a remote streaming request for the selected media item to the one of the plurality of nodes that is the source of the media item in the MCAS network; and
receiving a stream of the selected media item from the one of the plurality of nodes that is the source of the media item in the MCAS network.

33. A method of operation of a mobile node comprising:
at the mobile node:
discovering a Local Area Network (LAN) based ad-hoc Media Collection Aggregation System (MCAS) network formed by a plurality of nodes sharing corresponding shared media collections;
remotely participating in the MCAS network via a proxy node of the MCAS network,
obtaining credentials for the mobile node for remote active participation in the MCAS network when the mobile node was previously in the MCAS network, wherein the credentials for the mobile node for remote active participation in the MCAS network expire upon occurrence of an event selected from a group consisting of: expiration of a predefined amount of time and power-down of the mobile node; and
providing the credentials for the mobile node for remote active participation in the MCAS network to the proxy node of the MCAS network, wherein the mobile node is permitted to actively participate in the MCAS network remotely only if the mobile node can be authenticated using the credentials for the mobile node for remote active participation
wherein at least one of the preceding actions is performed on at least one electronic hardware component.

* * * * *